US012583974B2

(12) United States Patent
Kim et al.

(10) Patent No.: US 12,583,974 B2
(45) Date of Patent: Mar. 24, 2026

(54) POLYAMIDE-IMIDE-BASED FILM, PREPARATION METHOD THEREOF, AND COVER WINDOW AND DISPLAY DEVICE COMPRISING THE SAME

(71) Applicant: SK microworks Co., Ltd., Gyeonggi-do (KR)

(72) Inventors: Han Jun Kim, Gyeonggi-do (KR); Jin Woo Lee, Gyeonggi-do (KR); Jin Yong Lee, Gyeonggi-do (KR)

(73) Assignee: Microworks Solutions Co., Ltd., Chungcheongnam-do (KR)

( * ) Notice: Subject to any disclaimer, the term of this patent is extended or adjusted under 35 U.S.C. 154(b) by 761 days.

(21) Appl. No.: 17/962,140

(22) Filed: Oct. 7, 2022

(65) Prior Publication Data

US 2023/0183424 A1 Jun. 15, 2023

(30) Foreign Application Priority Data

Dec. 10, 2021 (KR) ........................ 10-2021-0176442
Dec. 21, 2021 (KR) ........................ 10-2021-0184330

(51) Int. Cl.
*C08G 73/14* (2006.01)
*C08J 5/18* (2006.01)
*C08L 79/08* (2006.01)

(52) U.S. Cl.
CPC ................ *C08G 73/14* (2013.01); *C08J 5/18* (2013.01); *C08L 79/08* (2013.01); *C08J 2379/08* (2013.01); *C08L 2203/16* (2013.01)

(58) Field of Classification Search
CPC ............. C08G 73/14; C08J 5/18; C08L 79/08
See application file for complete search history.

(56) References Cited

U.S. PATENT DOCUMENTS 11,873,372 B2 * 1/2024 Kim .................. C08G 73/1039
2001/0009312 A1 7/2001 Takeda
2015/0299392 A1 * 10/2015 Park .................... C09D 179/08
528/289
2020/0407506 A1 12/2020 Kim et al.
2020/0407521 A1 12/2020 Oh et al.
2020/0407522 A1 12/2020 Choi et al.
2020/0407557 A1 12/2020 Ki et al.

FOREIGN PATENT DOCUMENTS

EP 4137538 A1 2/2023
JP 2007-160704 A 6/2007
JP 2020003781 A 1/2020
JP 2021-070764 A 5/2021
KR 20010076306 A 8/2001
KR 20160101815 A 8/2016
KR 20210020395 A 2/2021

OTHER PUBLICATIONS

Song et al EP 3045490, original document and machine translation, published on Jul. 20, 2016.*
Extended European Search Report for the European Patent Application No. 22212933.0 issued by the European Patent Office on Apr. 13, 2023.
Office Action for the Japanese Patent Application No. 2022-165887 issued by the Japanese Patent Office on Oct. 31, 2023.
Office Action for the Korean Patent Application No. 10-2021-0176442 issued by the Korean Intellectual Property Office on Nov. 8, 2023.
Office Action for the Korean Patent Application No. 10-2021-0184330 issued by the Korean Intellectual Property Office on Dec. 4, 2023.

* cited by examiner

*Primary Examiner* — Gregory Listvoyb
(74) *Attorney, Agent, or Firm* — IP & T GROUP LLP

(57) ABSTRACT

The embodiments aim to provide a polyamide-imide-based film, which has a content of nitrogen (N) elements in the film of 6 to 7.5% by weight based on the sum of the weights of carbon (C), hydrogen (H), oxygen (O), and nitrogen (N) elements in the film, whereby it is uniform in quality and excellent in mechanical properties and optical properties, a process for preparing the same, and a cover window and a display device comprising the same.

14 Claims, 4 Drawing Sheets

POLYAMIDE-IMIDE-BASED FILM, PREPARATION METHOD THEREOF, AND COVER WINDOW AND DISPLAY DEVICE COMPRISING THE SAME

CROSS-REFERENCE OF RELATED APPLICATIONS

This application claims priority to Korean Patent Application No. 10-2021-0176442 filed on Dec. 10, 2021 and 10-2021-0184330 filed on Dec. 21, 2021, which are incorporated herein by reference in their entirety.

TECHNICAL FIELD

Embodiments relate to a polyamide-imide-based film, to a process for preparing the same, and to a cover window and a display device comprising the same.

BACKGROUND ART

Polyimide-based resins such as poly(amide-imide) (PAI) are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyimide is used in various fields. For example, polyimide is made in the form of a powder and used as a coating for a metal or a magnetic wire. It is mixed with other additives depending on the applications thereof. In addition, polyimide is used together with a fluoropolymer as a painter for decoration and corrosion prevention. It also plays a role of bonding a fluoropolymer to a metal substrate. Further, polyimide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyimide has been developed in the form of a film, which is less expensive and has excellent optical, mechanical, and thermal characteristics. Such a polyimide-based film may be applied to display materials for organic light-emitting diodes (OLEDs) or liquid crystal displays (LCDs), and the like, and to antireflection films, compensation films, and retardation films if retardation properties are implemented.

When such a polyimide-based film is immersed in a solvent in the post-process or when the film is exposed to light such as ultraviolet light, its optical properties are deteriorated. When it is applied to a cover window or a display device, there is a problem in that the quality reliability and product yield of a final product are deteriorated due to the non-uniform quality of the film in the transverse direction or the variation in the physical properties thereof in the directions.

Thus, there has been a continuous demand for the development of a film that has little variation in the quality of the film and has isotropy, along with excellent mechanical properties, optical properties, solvent resistance, and light resistance while the above problems are solved.

DETAILED DESCRIPTION OF THE INVENTION

Technical Problem

The embodiments aim to provide a polyamide-imide-based film that is uniform in quality, has isotropy, and is excellent in mechanical properties, optical properties, solvent resistance, and light resistance, a process for preparing the same, and a cover window and a display device comprising the same.

Solution to the Problem

The polyamide-imide-based film according to an embodiment has a content of nitrogen (N) elements in the film of 6 to 7.5% by weight based on the sum of the weights of carbon (C), hydrogen (H), oxygen (O), and nitrogen (N) elements in the film.

The cover window for a display device according to another embodiment comprises a polyamide-imide-based film and a functional layer, wherein the content of nitrogen (N) elements in the polyamide-imide-based film is 6 to 7.5% by weight based on the sum of the weights of carbon (C), hydrogen (H), oxygen (O), and nitrogen (N) elements in the film.

The display device according to another embodiment comprises a display unit; and a cover window disposed on the display unit, wherein the cover window comprises a polyamide-imide-based film and a functional layer, and the content of nitrogen (N) elements in the polyamide-imide-based film is 6 to 7.5% by weight based on the sum of the weights of carbon (C), hydrogen (H), oxygen (O), and nitrogen (N) elements in the film.

The process for preparing a polyamide-imide-based film according to an embodiment comprises polymerizing a diamine compound, a dianhydride compound, and a dicarbonyl compound in an organic solvent to prepare a polyamide-imide-based polymer solution; casting the solution and then drying it to prepare a gel sheet; and thermally treating the gel sheet, wherein the step of thermally treating the gel sheet comprises thermally treating it through a first heater, a second heater, and a third heater spaced apart in the TD direction of the gel sheet, and when the temperature of the first heater corresponding to the center of the gel sheet is $T_{HC}$, and when the temperatures of the second heater and the third heater corresponding to both ends of the gel sheet are $T_{HN}$ and $T_{HS}$, respectively, $T_{HN}$ and $T_{HS}$ are higher than $T_{HC}$.

Advantageous Effects of the Invention

As the polyamide-imide-based film according to the embodiments has a content of nitrogen (N) elements in the film at a specific level based on the sum of the weights of carbon (C), hydrogen (H), oxygen (O), and nitrogen (N) elements in the film, it has little variation in the physical properties in the TD direction, whereby its quality is uniform in the transverse direction, and it can have excellent mechanical properties, optical properties, and solvent resistance characteristics.

Once the polyamide-imide-based film has been prepared, it is subjected to a post-process such as a process in which a functional layer is laminated for imparting functions such as anti-fingerprint, antistatic, scattering prevention, and adhesion enhancement. In such a post-process, when additional thermal treatment or the like is carried out, the non-uniformity in the film quality is amplified, which may increase the defect rate of a final product. Thus, the uniform quality of the polyamide-imide-based film itself is an important management factor.

As the content of nitrogen (N) elements in the polyamide-imide-based film according to an embodiment is controlled to a specific range, the quality reliability and product yield of a final product such as a cover window for a display device or a display device to which the film has been applied can be enhanced.

In addition, when a film is exposed to a solvent during the post-process, a film with low solvent resistance may suffer from deterioration in the optical and mechanical properties such as a steep increase in the haze after immersion in a solvent; thus, it is advantageous for a film to have excellent solvent resistance.

In addition, when a film is exposed to light such as ultraviolet light, a film with low light resistance may suffer from deterioration in the optical properties such as a steep increase in the haze due to yellowing by light; thus, it is advantageous for a film to have excellent light resistance.

BEST MODE FOR CARRYING OUT THE INVENTION

Figure 1:
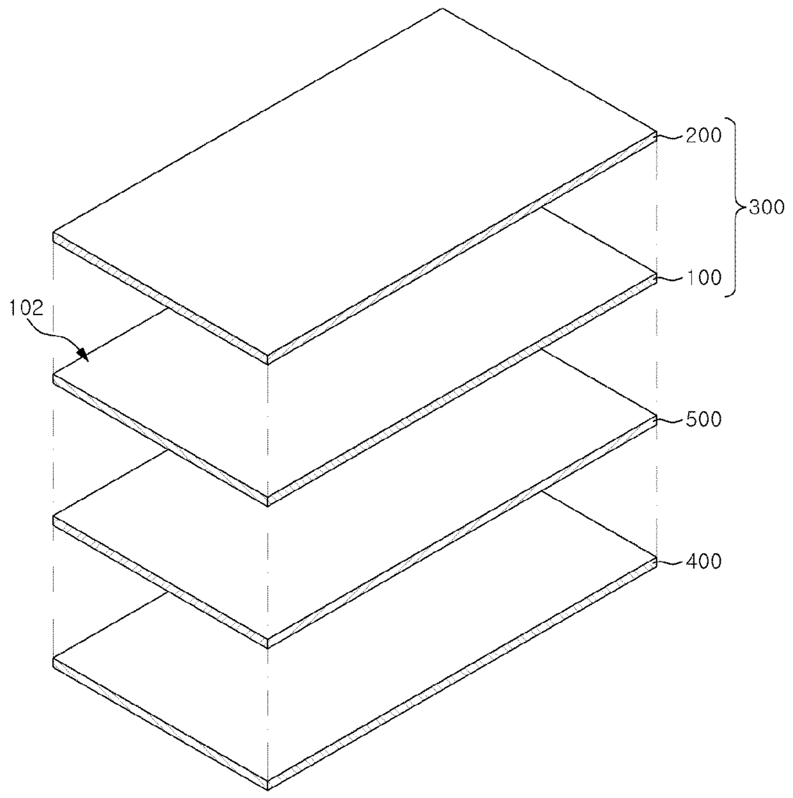
FIG. 1 is a schematic exploded view of a display device according to an embodiment.

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers and expressions related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

Polyamide-Imide-Based Film

As the embodiment satisfies a content of nitrogen (N) elements at a specific level based on the sum of the weights of carbon (C), hydrogen (H), oxygen (O), and nitrogen (N) elements in the film, it can provide a polyamide-imide-based film that has little variation in the physical properties in the TD direction, whereby its quality is uniform, has isotropy, and has excellent mechanical properties, optical properties, solvent resistance, and light resistance.

The polyamide-imide-based film according to an embodiment has a content of nitrogen (N) elements in the film of 6 to 7.5% by weight based on the sum of the weights of carbon (C), hydrogen (H), oxygen (O), and nitrogen (N) elements in the film.

Specifically, the content of nitrogen (N) elements in the polyamide-imide-based film may be 6% by weight or more, 6.1% by weight or more, 6.2% by weight or more, or 6.3% by weight or more, and 7.5% by weight or less, 7.4% by weight or less, 7.3% by weight or less, or 7% by weight or less, based on the sum of the weights of carbon (C), hydrogen (H), oxygen (O), and nitrogen (N) elements in the film.

More specifically, the content of nitrogen (N) elements in the polyamide-imide-based film may be 6 to 7.3% by weight, 6 to 7% by weight, 6.3 to 7.5% by weight, 6.3 to 7.3% by weight, or 6.3 to 7% by weight, based on the sum of the weights of carbon (C), hydrogen (H), oxygen (O), and nitrogen (N) elements in the film, but it is not limited thereto.

The contents of carbon (C), hydrogen (H), oxygen (O), and nitrogen (N) elements may be values measured using an element analysis (EA), for example, a model name of Flash2000 (Thermo Fisher Scientific, Germany). Alternatively, the content of each element may be a value measured by nuclear magnetic resonance (NMR).

The content of nitrogen (N) elements in the polyamide-imide-based film may be 4 to 7% by weight based on the total weight of the film.

Specifically, the content of nitrogen (N) elements in the polyamide-imide-based film may be 4% by weight or more, 4.2% by weight or more, 4.4% by weight or more, 4.6% by weight or more, 4.8% by weight or more, 5% by weight or more, or 5.2% by weight or more, and 7% by weight or less, 6.8% by weight or less, 6.6% by weight or less, 6.4% by weight or less, 6.2% by weight or less, 6% by weight or less, or 5.8% by weight or less, based on the total weight of the film.

More specifically, the content of nitrogen (N) elements in the polyamide-imide-based film may be 5 to 7% by weight, 5 to 6.2% by weight, 5 to 6% by weight, 5 to 5.8% by weight, 5.2 to 7% by weight, 5.2 to 6.2% by weight, 5.2 to 6% by weight, or 5.2 to 5.8% by weight, based on the total weight of the film, but it is not limited thereto.

The content of nitrogen (N) elements in the polyamide-imide-based film may be 8 to 12 parts by weight relative to 100 parts by weight of carbon (C) elements in the film.

Specifically, the content of nitrogen (N) elements in the polyamide-imide-based film may be 8 parts by weight or more, 8.2 parts by weight or more, 8.4 parts by weight or more, 8.6 parts by weight or more, 8.8 parts by weight or more, or 9 parts by weight or more, and 12 parts by weight or less, 11.8 parts by weight or less, 11.6 parts by weight or less, 11.4 parts by weight or less, 11.2 parts by weight or less, 11 parts by weight or less, 10.8 parts by weight or less, 10.6 parts by weight or less, 10.5 parts by weight or less, 10.4 parts by weight or less, 10.2 parts by weight or less, or 10 parts by weight or less, relative to 100 parts by weight of carbon (C) elements in the film.

More specifically, the content of nitrogen (N) elements in the polyamide-imide-based film may be 8 to 11.2 parts by weight, 8 to 11 parts by weight, 8 to 10.6 parts by weight, 8 to 10 parts by weight, 9 to 12 parts by weight, 9 to 11.2 parts by weight, 9 to 11 parts by weight, 9 to 10.6 parts by weight, or 9 to 10 parts by weight, relative to 100 parts by weight of carbon (C) elements in the film, but it is not limited thereto.

The sum of the contents of nitrogen (N) and hydrogen (H) elements in the polyamide-imide-based film may be 6 to 9% by weight based on the total weight of the film.

Specifically, the sum of the contents of nitrogen (N) and hydrogen (H) elements in the polyamide-imide-based film may be 6% by weight or more, 6.2% by weight or more, 6.4% by weight or more, 6.6% by weight or more, 6.8% by weight or more, 7% by weight or more, 7.2% by weight or more, or 7.4% by weight or more, and 9% by weight or less, 8.8% by weight or less, 8.6% by weight or less, 8.4% by weight or less, 8.2% by weight or less, or 8% by weight or less, based on the total weight of the film.

More specifically, the sum of the contents of nitrogen (N) and hydrogen (H) elements in the polyamide-imide-based film may be 7 to 9% by weight, 7 to 8.8% by weight, 7 to 8% by weight, 7.4 to 9% by weight, 7.4 to 8.8% by weight, or 7.4 to 8% by weight, based on the total weight of the film, but it is not limited thereto.

According to an embodiment, the polyamide-imide-based film may have an $EC_A$ value of 15.9 or more as defined by the following Equation 1.

$$EC_A = \frac{22C_W}{(2O_W + 12H_W + 2N_W)} \quad \text{[Equation 1]}$$

In Equation 1, $C_w$ is the content (% by weight) of carbon (C) elements contained in the film based on the total weight of the film, $O_w$ is the content (% by weight) of oxygen (O) elements contained in the film based on the total weight of the film, $H_w$ is the content (% by weight) of hydrogen (H) elements contained in the film based on the total weight of the film, and $N_w$ is the content (% by weight) of nitrogen (N) elements contained in the film based on the total weight of the film.

Specifically, $EC_A$ of the polyamide-imide-based film may be 16 or more, 16.2 or more, 16.4 or more, 16.6 or more, or 16.8 or more, and 21 or less, 20.5 or less, 20 or less, 19.5 or less, 19 or less, 18.5 or less, or 18 or less.

More specifically, $EC_A$ of the polyamide-imide-based film may be 15.9 to 20, 15.9 to 19, 15.9 to 18, 16 to 20, 16 to 19, or 16 to 18, but it is not limited thereto.

The polyamide-imide-based film may have an $EC_B$ value of 15.3 or more as defined by the following Equation 2.

$$EC_B = \frac{33C_W}{(4O_W + 12H_W + 2N_W)} \quad \text{[Equation 2]}$$

In Equation 2, $C_w$ is the content (% by weight) of carbon (C) elements contained in the film based on the total weight of the film, $O_w$ is the content (% by weight) of oxygen (O) elements contained in the film based on the total weight of the film, $H_w$ is the content (% by weight) of hydrogen (H) elements contained in the film based on the total weight of the film, and $N_w$ is the content (% by weight) of nitrogen (N) elements contained in the film based on the total weight of the film.

Specifically, $EC_B$ of the polyamide-imide-based film may be 15.5 or more, 15.8 or more, 16 or more, 16.3 or more, 16.5 or more, 16.8 or more, or 17 or more, and 21 or less, 20.5 or less, 20 or less, 19.5 or less, 19 or less, 18.5 or less, or 18 or less.

More specifically, $EC_B$ of the polyamide-imide-based film may be 15.3 to 20, 15.3 to 19, 15.3 to 18, 16 to 20, 16 to 19, 16 to 18, 16.8 to 20, 16.8 to 19, or 16.8 to 18, but it is not limited thereto.

The polyamide-imide-based film may have an $EC_C$ value of 14 or more as defined by the following Equation 3.

$$EC_C = \frac{30C_W}{(4O_W + 12H_W + 2N_W)} \quad \text{[Equation 3]}$$

In Equation 3, $C_w$ is the content (% by weight) of carbon (C) elements contained in the film based on the total weight of the film, $O_w$ is the content (% by weight) of oxygen (O) elements contained in the film based on the total weight of the film, $H_w$ is the content (% by weight) of hydrogen (H) elements contained in the film based on the total weight of the film, and $N_w$ is the content (% by weight) of nitrogen (N) elements contained in the film based on the total weight of the film.

Specifically, $EC_C$ of the polyamide-imide-based film may be 14.3 or more, 14.5 or more, 14.8 or more, 15 or more, 15.3 or more, or 15.5 or more, and 20 or less, 19.5 or less, 19 or less, 18.5 or less, 18 or less, 17.5 or less, 17 or less, or 16.5 or less.

More specifically, $EC_C$ of the polyamide-imide-based film may be 14 to 19, 14 to 18, 14 to 17, 14 to 16.5, 15 to 19, 15 to 18, 15 to 17, 15 to 16.5, 15.3 to 19, 15.3 to 18, 15.3 to 17, or 15.3 to 16.5, but it is not limited thereto.

The polyamide-imide-based film may have an $EC_D$ value of 10.5 or more as defined by the following Equation 4.

$$EC_D = \frac{(C_W + O_W)}{N_W} \quad \text{[Equation 4]}$$

In Equation 4, $C_w$ is the content (% by weight) of carbon (C) elements contained in the film based on the total weight of the film, $O_w$ is the content (% by weight) of oxygen (O) elements contained in the film based on the total weight of the film, and $N_w$ is the content (% by weight) of nitrogen (N) elements contained in the film based on the total weight of the film.

Specifically, $EC_D$ of the polyamide-imide-based film may be 11 or more, 11.3 or more, 11.5 or more, 11.8 or more, 12 or more, 12.2 or more, or 12.3 or more, and 17 or less, 16.5 or less, 16 or less, 15.5 or less, 15 or less, or 14.5 or less.

More specifically, $EC_D$ of the polyamide-imide-based film may be 10.5 to 17, 10.5 to 16, 10.5 to 15, 10.5 to 14.5, 11.5 to 17, 11.5 to 16, 11.5 to 15, 11.5 to 14.5, 12 to 17, 12 to 16, 12 to 15, or 12 to 14.5, but it is not limited thereto.

The polyamide-imide-based film may have a content of carbon (C) elements in the film of 66.7% by weight or more based on the sum of the weights of carbon (C), hydrogen (H), oxygen (O), and nitrogen (N) elements in the film.

Specifically, the content of carbon (C) elements in the polyamide-imide-based film may be 67% by weight or more, 67.4% by weight or more, 67.6% by weight or more, 68% by weight or more, 68.4% by weight or more, 68.6% by weight or more, or 69% by weight or more, and 73% by weight or less, 72.5% by weight or less, 72% by weight or less, 71.5% by weight or less, 71% by weight or less, 70.5% by weight or less, or 70% by weight or less, based on the sum of the weights of carbon (C), hydrogen (H), oxygen (O), and nitrogen (N) elements in the film.

More specifically, the content of carbon (C) elements in the polyamide-imide-based film may be 66.7 to 72% by weight, 66.7 to 71% by weight, 66.7 to 70% by weight, 67 to 72% by weight, 67 to 71% by weight, 67 to 70% by weight, 68.4 to 72% by weight, 68.4 to 71% by weight, or 68.4 to 70% by weight, based on the sum of the weights of carbon (C), hydrogen (H), oxygen (O), and nitrogen (N) elements in the film, but it is not limited thereto.

Since the element contents of the polyamide-imide-based film according to an embodiment satisfy the above ranges, the quality variation in the TD direction is significantly reduced, it has isotropy, and the amount of change in haze is below a certain level even after it is immersed in a solvent mainly used for post-process or exposed to light for a certain period of time, resulting in excellent solvent resistance and light resistance of the film.

On the other hand, if the polyamide-imide-based film according to an embodiment has element contents outside the above ranges, the amount of change in haze is large after it is immersed in a solvent or exposed to ultraviolet light, resulting in deteriorated optical properties upon post-process, and the quality variation in the TD direction of the film and/or the quality variation between the MD and TD directions to be described below is large, which deteriorates the quality of the film itself and directly lead to a product with a high defect rate when subjected to a post-process.

The content of carbon (C) elements in the polyamide-imide-based film may be 53 to 60% by weight based on the total weight of the film.

Specifically, the content of carbon (C) elements in the polyamide-imide-based film may be 53% by weight or more, 54% by weight or more, 55% by weight or more, 55.5% by weight or more, 56% by weight or more, or 56.5% by weight or more, and 60% by weight or less, 59.5% by weight or less, 59% by weight or less, or 58.5% by weight or less, based on the total weight of the film.

More specifically, the content of carbon (C) elements in the polyamide-imide-based film may be 55 to 60% by weight, 55 to 59% by weight, 55 to 58.5% by weight, 56 to 60% by weight, 56 to 59% by weight, or 56 to 58.5% by weight, based on the total weight of the film, but it is not limited thereto.

The content of hydrogen (H) elements in the polyamide-imide-based film may be 1.5 to 3.5% by weight based on the total weight of the film.

Specifically, the content of hydrogen (H) elements in the polyamide-imide-based film may be 1.5% by weight or more, 1.8% by weight or more, or 2.1% by weight or more, and 3.5% by weight or less, 3.2% by weight or less, 3% by weight or less, or 2.8% by weight or less, based on the total weight of the film.

More specifically, the content of hydrogen (H) elements in the polyamide-imide-based film may be 1.8 to 3.5% by weight, 1.8 to 3% by weight, 1.8 to 2.8% by weight, 2.1 to 3% by weight, or 2.1 to 2.8% by weight, based on the total weight of the film, but it is not limited thereto.

The content of oxygen (O) elements in the polyamide-imide-based film may be 15 to 19% by weight based on the total weight of the film.

Specifically, the content of oxygen (O) elements in the polyamide-imide-based film may be 15% by weight or more, 15.5% by weight or more, 16% by weight or more, or 16.5% by weight or more, and 19% by weight or less, 18.5% by weight or less, or 18% by weight or less, based on the total weight of the film.

More specifically, the content of oxygen (O) elements in the polyamide-imide-based film may be 15.5 to 18.5% by weight, 15.5 to 18% by weight, 16 to 18.5% by weight, or 16 to 18% by weight, based on the total weight of the film, but it is not limited thereto.

The sum of the contents of carbon (C), hydrogen (H), oxygen (O), and nitrogen (N) elements in the polyamide-imide-based film may be 80 to 85% by weight based on the total weight of the film.

Specifically, the sum of the contents of carbon (C), hydrogen (H), oxygen (O), and nitrogen (N) elements in the polyamide-imide-based film may be 80% by weight or more, 80.5% by weight or more, 81% by weight or more, or 81.5% by weight or more, and 85% by weight or less, 84.5% by weight or less, or 84% by weight or less, based on the total weight of the film.

More specifically, the sum of the contents of carbon (C), hydrogen (H), oxygen (O), and nitrogen (N) elements in the polyamide-imide-based film may be 81.5 to 84.5% by weight, 81.5 to 84% by weight, 82 to 84.5% by weight, or 82 to 84% by weight, based on the total weight of the film, but it is not limited thereto.

The film comprises three regions of region N, region C, and region S partitioned in the TD direction. In the film, when the width of region N is wN, the width of region C is wC, and the width of region S is wS, the width of the film is equal to the sum of wN, wC, and wS.

When the transmittance is measured at six points in total, in which two arbitrary points are selected in each of region N, region C, and region S partitioned in the TD direction of the polyamide-imide-based film, the average value of transmittance may be 80 or more, and the deviation rate of transmittance may be 0.5% or less.

Specifically, the average value of transmittance of the polyamide-imide-based film may be 82% or more, 84% or more, 86% or more, 88% or more, or 89% or more, and the deviation rate of transmittance may be 0.4% or less, 0.3% or less, 0.25% or less, 0.2% or less, or 0.15% or less.

When the haze is measured at six points in total, in which two arbitrary points are selected in each of region N, region C, and region S partitioned in the TD direction of the polyamide-imide-based film, the average value of haze may be 1% or less, and the deviation rate of haze may be 10% or less.

Specifically, the average value of haze of the polyamide-imide-based film may be 0.7% or less, 0.5% or less, or 0.4% or less, and the deviation rate of haze may be 9.5% or less, 9% or less, 8.5% or less, 8% or less, or 7.5% or less.

When the yellow index is measured at six points in total, in which two arbitrary points are selected in each of region N, region C, and region S partitioned in the TD direction of the polyamide-imide-based film, the average value of yellow index is 5 or less, and the deviation rate of yellow index is 10% or less.

Specifically, the average value of yellow index of the polyamide-imide-based film may be 4.5 or less, 4 or less, or 3.5 or less, and the deviation rate of yellow index may be 8% or less, 7% or less, or 6% or less.

When the modulus is measured at six points in total, in which two arbitrary points are selected in each of region N, region C, and region S partitioned in the TD direction of the polyamide-imide-based film, the average value of modulus is 5 GPa or more, and the deviation rate of modulus is 10% or less.

Specifically, the average value of modulus of the polyamide-imide-based film may be 5.5 GPa or more or 6 GPa or more, and the deviation rate of modulus may be 7% or less, 5% or less, 4% or less, or 3% or less.

If the average values and deviation rates related to transmittance, haze, yellow index, and/or modulus of the polyamide-imide-based film according to an embodiment are within the above ranges, the physical properties are excellent, as well as the film has little variation in the physical properties in the transverse direction (TD direction), whereby there is almost no quality variation when the film, once it has been prepared, is cut to a required shape or size for being subjected to a post-process, which increases the product yield and is therefore economical.

On the other hand, if the average values and deviation rates related to transmittance, haze, yellow index, and/or modulus of the polyamide-imide-based film according to an embodiment are outside the above ranges, it means that the quality is different, though slightly, depending on the location of the film. Thus, when it is applied to a product, it may have a lot of defects. In particular, when the film is commercialized, it may be subjected to severe conditions such as additional thermal treatment. In this course, its non-uniform quality may be further amplified.

In an embodiment, the polyamide-imide-based film may have an $R_{MO}$ value of 95% to 105% as defined by the following Equation 5.

$$R_{MO}(\%) = \frac{MO_T}{MO_M} * 100 \quad \text{[Equation 5]}$$

In Equation 5, $MO_T$ is the modulus measured with the TD direction of the film as the longitudinal direction, and $MO_M$ is the modulus measured with the MD direction of the film as the longitudinal direction.

Specifically, the $R_{MO}$ value of the polyamide-imide-based film may be 95% or more, 96% or more, 97% or more, or 98% or more, and 105% or less, 104% or less, 103% or less, 102% or less, 101% or less, or 100% or less.

More specifically, the $R_{MO}$ value of the polyamide-imide-based film may be 95% to 103%, 95% to 100%, 97% to 105%, 97% to 103%, 97% to 100%, 98% to 105%, 98% to 103%, or 98% to 100%, but it is not limited thereto.

The polyamide-imide-based film may have a modulus ($MO_T$) of 5 GPa or more measured with its TD direction as the longitudinal direction. Specifically, the modulus may be 5.5 GPa or more, 5.7 GPa or more, 6 GPa or more, or 6.2 GPa or more. In addition, the modulus may be 10 GPa or less, but it is not limited thereto.

The polyamide-imide-based film may have a modulus ($MO_M$) of 5 GPa or more measured with its MD direction as the longitudinal direction. Specifically, the modulus may be 5.5 GPa or more, 5.7 GPa or more, 6 GPa or more, or 6.2 GPa or more. In addition, the modulus may be 10 GPa or less, but it is not limited thereto.

In an embodiment, the polyamide-imide-based film may have an $R_{EL}$ value of 90% to 110% as defined by the following Equation 6.

$$R_{EL}(\%) = \frac{EL_T}{EL_M} * 100 \quad \text{[Equation 6]}$$

In Equation 6, $EL_T$ is the elongation measured with the TD direction of the film as the longitudinal direction, and $EL_M$ is the elongation measured with the MD direction of the film as the longitudinal direction.

Specifically, the $R_{EL}$ value of the polyamide-imide-based film may be 90% or more, 92% or more, 94% or more, 96% or more, or 97% or more, and 110% or less, 108% or less, 106% or less, 104% or less, or 100% or less.

More specifically, the $R_{EL}$ value of the polyamide-imide-based film may be 90% to 104%, 90% to 100%, 94% to 110%, 94% to 104%, 94% to 100%, 97% to 110%, 97% to 104%, or 97% to 100%, but it is not limited thereto.

The polyamide-imide-based film may have an elongation ($EL_T$) of 15% to 35% measured with its TD direction as the longitudinal direction. Specifically, the elongation may be 15% or more, 17% or more, 20% or more, or 22% or more, and 35% or less, 32% or less, 30% or less, 27% or less, or 25% or less. More specifically, the elongation may be 15% to 30%, 15% to 25%, 20% to 35%, 20% to 30%, or 20% to 25%, but it is not limited thereto.

The polyamide-imide-based film may have an elongation ($EL_M$) of 15% to 35% measured with its MD direction as the longitudinal direction. Specifically, the elongation may be 15% or more, 17% or more, 20% or more, or 22% or more, and 35% or less, 32% or less, 30% or less, 27% or less, or 25% or less. More specifically, the elongation may be 15% to 30%, 15% to 25%, 20% to 35%, 20% to 30%, or 20% to 25%, but it is not limited thereto.

If the modulus and/or elongation of the polyamide-imide-based film according to an embodiment and the ratio thereof in the TD direction/MD direction are within the above ranges, the physical properties themselves are excellent, as well as the film has little variation in the physical properties between the transverse direction (TD direction) and the longitudinal direction (MD direction), whereby the film has isotropy, and the quality reliability is enhanced. In addition, there is almost no quality variation when the film, once it has been prepared, is cut to a required shape or size for being subjected to a post-process, which increases the product yield and is therefore economical.

On the other hand, if the modulus and/or elongation of the polyamide-imide-based film according to an embodiment and the ratio thereof (in the TD direction/MD direction) are outside the above ranges, it means that the quality is different depending on the direction of the film. Thus, when it is applied to a product, it may have a lot of defects. In particular, when the film is commercialized, it may be subjected to severe conditions such as additional thermal treatment in the post-process thereof. In this course, its non-uniform quality may be further amplified.

In some embodiments, the polyamide-imide-based film may have a transmittance of 80% or more, a haze of 1% or less, a yellow index of 5 or less, a modulus in the MD direction of 5 GPa or more, a modulus in the TD direction of 5 GPa or more, an elongation in the MD direction of 20% to 30%, and an elongation in the TD direction of 20% to 30%, but it is not limited thereto.

Such physical properties as transmittance, haze, and yellow index of the polyamide-imide-based film may be an average of values measured at two or more arbitrary points. Specifically, they may be an average of values measured at six points in total, in which two arbitrary points are selected in each of region N, region C, and region S of the prepared film.

In some embodiments, the polyamide-imide-based film may have a thickness deviation of 3 μm or less, 2 μm or less, 1.5 μm or less, or 1.2 μm or less, based on a thickness of 50 μm. In addition, the thickness deviation rate may be 5% or less, 4% or less, 3% or less, or 2.5% or less, but it is not limited thereto.

The thickness deviation and thickness deviation rate may refer to an average of thicknesses, a deviation thereof, and a deviation rate thereof, respectively, measured at six points in total, in which two arbitrary points are selected in each of region N, region C, and region S partitioned in the TD direction of the film. In such a case, as the polyamide-imide-based film has a uniform thickness, its optical properties and mechanical properties at each point may be uniformly exhibited.

When the polyamide-imide-based film is immersed in MIBK for 5 seconds and dried at 80° C. for 3 minutes, the amount of change in haze ($\Delta Hz_M$) may be 0.2% or less when its haze is measured.

Specifically, the amount of change in haze ($\Delta Hz_M$) of the polyamide-imide-based film after it is immersed in MIBK may be 0.19% or less, 0.18% or less, 0.17% or less, 0.15% or less, or 0.12% or less, but it is not limited thereto.

$\Delta Hz_M$ (%) is a value of $Hz_M - Hz_0$, in which $Hz_0$ stands for the initial haze (%) of the film, and $Hz_M$ stands for the haze (%) measured after the film is immersed in an MIBK solvent for 5 seconds and dried at 80° C. for 3 minutes.

When the polyamide-imide-based film is immersed in IPA for 5 seconds and dried at 80° C. for 3 minutes, the amount of change in haze ($\Delta Hz_1$) may be 0.1% or less when its haze is measured.

Specifically, the amount of change in haze ($\Delta Hz_1$) of the polyamide-imide-based film after it is immersed in IPA may be 0.08% or less, 0.06% or less, or 0.05% or less, but it is not limited thereto.

$\Delta Hz_1$ (%) is a value of $Hz_1 - Hz_0$, in which $Hz_0$ stands for the initial haze (%) of the film, and $Hz_1$ stands for the haze (%) measured after the film is immersed in an IPA solvent for 5 seconds and dried at 80° C. for 3 minutes.

The average value ($\Delta Hz_{AVG}$) of the amount of change in haze ($\Delta Hz_M$) of the polyamide-imide-based film after it is immersed in MIBK 5 seconds and dried at 80° C. for 3 minutes and the amount of change in haze ($\Delta Hz_1$) of the polyamide-imide-based film after it is immersed in IPA 5 seconds and dried at 80° C. for 3 minutes may be 0.15% or less.

Specifically, the average value ($\Delta Hz_{AVG}$) of the amounts of change in haze of the polyamide-imide-based film may be 0.13% or less, 0.11% or less, or 0.1% or less, but it is not limited thereto.

The average value ($\Delta Hz_{AVG}$) of the amounts of change in haze may be a measure for determining the solvent resistance of a film.

When the polyamide-imide-based film is irradiated with a UV-A lamp (wavelength 340 nm) at 0.63 W/m$^2$ at 60° C. for 72 hours, the amount of change in yellow index (ΔYI) may be 5 or less when the yellowness is measured.

Specifically, the amount of change in yellow index (ΔYI) of the polyamide-imide-based film after it is irradiated with UV may be 4.8 or less, 4.6 or less, 4.4 or less, 4.2 or less, or 4 or less, but it is not limited thereto.

ΔYI is a value of $YI_1 - YI_0$, in which $YI_0$ stands for the initial yellow index of the polyamide-imide-based film, and $YI_1$ stands for the yellow index measured after the film is irradiated with a UV-A lamp (wavelength 340 nm) at 0.63 W/m$^2$ at 60° C. for 72 hours.

The amount of change in yellow index (ΔYI) may be a measure for determining the light resistance of a film.

If the amount of change in yellow index of the polyamide-imide-based film according to an embodiment is within the above range, there is little change in appearance even when the film is exposed to light such as ultraviolet light; thus, it can directly lead to a product of high quality.

The polyamide-imide-based film may have a compressive strength of 0.4 kgf/μm or more. Specifically, the compressive strength may be 0.45 kgf/μm or more, or 0.46 kgf/μm or more, but it is not limited thereto.

When the polyamide-imide-based film is perforated at a speed of 10 mm/minute using a 2.5-mm spherical tip in a UTM compression mode, the maximum diameter (mm) of perforation including a crack is 60 mm or less. Specifically, the maximum diameter of perforation may be 5 to 60 mm, 10 to 60 mm, 15 to 60 mm, 20 to 60 mm, 25 to 60 mm, or 25 to 58 mm, but it is not limited thereto.

The polyamide-imide-based film may have a surface hardness of HB or higher. Specifically, the surface hardness may be H or higher, or 2H or higher, but it is not limited thereto.

The polyamide-imide-based film may have a tensile strength of 15 kgf/mm$^2$ or more. Specifically, the tensile strength may be 18 kgf/mm$^2$ or more, 20 kgf/mm$^2$ or more, 21 kgf/mm$^2$ or more, or 22 kgf/mm$^2$ or more, but it is not limited thereto.

The polyamide-imide-based film may have an elongation of 15% or more. Specifically, the elongation may be 16% or more, 17% or more, or 18% or more, but it is not limited thereto.

When the polyamide-imide-based film based on a thickness of 50 μm is folded to have a radius of curvature of 3 mm, the number of folding before the fracture may be 200,000 or more.

The number of folding counts one when the film is folded to have a radius of curvature of 3 mm and then unfolded.

As the number of folding of the polyamide-imide-based film satisfies the above range, it can be advantageously applied to a foldable display device or a flexible display device.

The polyamide-imide-based film may have a surface roughness of 0.01 μm to 0.07 μm. Specifically, the surface roughness may be 0.01 μm to 0.07 μm or 0.01 μm to 0.06 μm, but it is not limited thereto.

As the surface roughness of the polyamide-imide-based film satisfies the above range, it may be advantageous for achieving luminance conditions or a sense of texture preferable for the application thereof to a display device.

The content of residual solvents in the polyamide-imide-based film may be 1,500 ppm or less. For example, the content of residual solvents may be 1,200 ppm or less, 1,000 ppm or less, 800 ppm or less, 500 ppm or less, or 300 ppm or less, but it is not limited thereto.

The residual solvent refers to a solvent that has not been volatilized during the film production and remains in the film finally produced.

If the content of the residual solvents in the polyamide-imide-based film exceeds the above range, the durability of the film may be deteriorated, and it may have an impact on the quality variation of the film. In particular, since it affects the mechanical strength, it may adversely affect the post-process of the film. Since the hygroscopicity of the film is accelerated, its optical properties or light resistance and thermal resistance, let alone the mechanical properties, may be deteriorated as well.

The polyamide-imide-based film according to an embodiment comprises a polyamide-imide-based polymer, which is prepared by polymerizing a diamine compound, a dianhydride compound, and a dicarbonyl compound.

The polyamide-imide-based polymer is a polymer that contains an imide repeat unit and an amide repeat unit.

Specifically, the polyamide-imide-based polymer comprises an imide repeat unit derived from the polymerization of the diamine compound and the dianhydride compound and an amide repeat unit derived from the polymerization of the diamine compound and the dicarbonyl compound.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

$H_2N\text{-}(E)_e\text{-}NH_2$ [Formula 1]

In Formula 1,

E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(═O)—, —CH(OH)—, —S(═O)$_2$—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

$(E)_e$ in Formula 1 may be selected from the groups represented by the following Formulae 1-1a to 1-14a, but it is not limited thereto.

1-1a

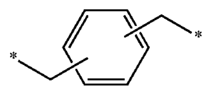

1-2a

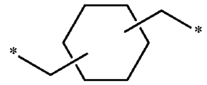

1-3a

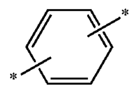

1-4a

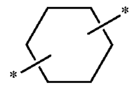

1-5a

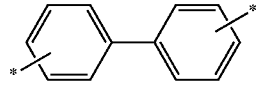

1-6a

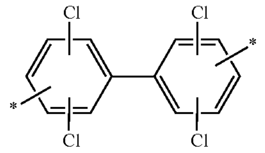

1-7a

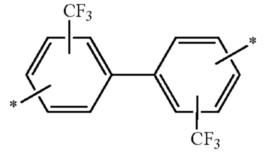

1-8a

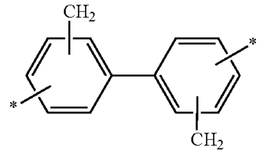

1-9a

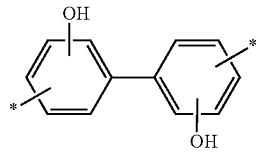

1-10a

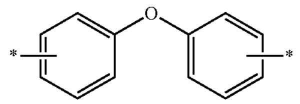

1-11a

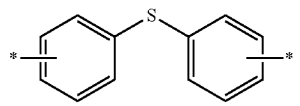

-continued 1-12a

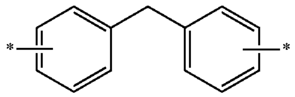

1-13a

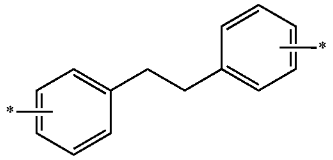

1-14a $*—(CH_2)_n—*$ (n is selected from integers of 1 to 12)

Specifically, $(E)_e$ in Formula 1 may be selected from the groups represented by the following Formulae 1-1b to 1-13b, but it is not limited thereto.

1-1b

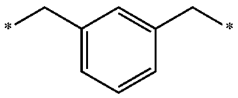

1-2b

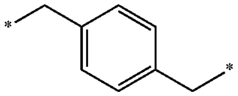

1-3b

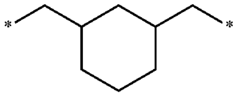

1-4b

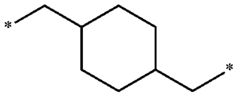

1-5b

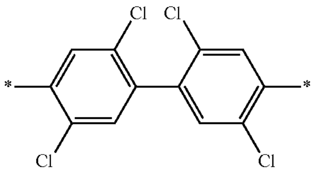

1-6b

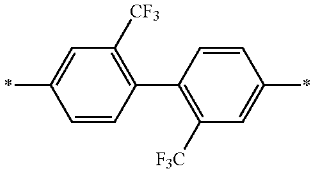

1-7b

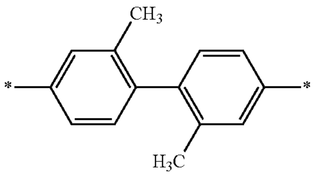

-continued 1-8b

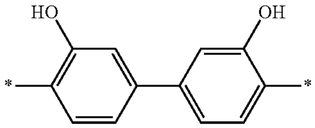

1-9b

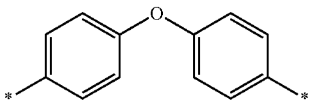

1-10b

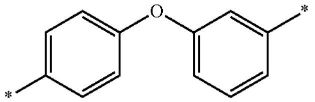

1-11b

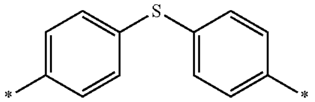

1-12b

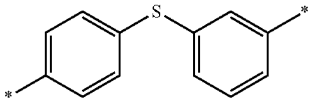

1-13b

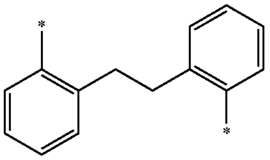

More specifically, $(E)_e$ in Formula 1 may be the group represented by the above Formula 1-6b or the group represented by the above Formula 1-9b.

In an embodiment, the diamine compound may comprise a compound having a fluorine-containing substituent or a compound having an ether group (—O—).

The diamine compound may be composed of a compound having a fluorine-containing substituent. In such an event, the fluorine-containing substituent may be a fluorinated hydrocarbon group and specifically may be a trifluoromethyl group. But it is not limited thereto.

In some embodiments, the diamine compound may comprise one kind of diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

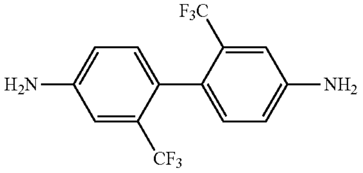

TFDB

The dianhydride compound has a low birefringence value, so that it can contribute to enhancements in the optical properties such as transmittance of a film that comprises the polyamide-imide-based polymer.

The dianhydride compound is not particularly limited, but it may be, for example, an aromatic dianhydride compound that contains an aromatic structure. For example, the aromatic dianhydride compound may be a compound represented by the following Formula 2.

[Formula 2]

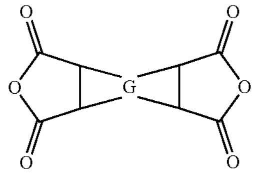

In Formula 2, G may be a group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone, may be fused to each other to form a condensed ring, or may be bonded by a bonding group selected from a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(═O)—, —CH(OH)—, —S(═O)$_2$—, —Si(CH$_3$)$_2$—, —C(CH$_3$)$_2$—, and —C(CF$_3$)$_2$—.

G in the above Formula 2 may be selected from the groups represented by the following Formulae 2-1a to 2-9a, but it is not limited thereto.

2-1a

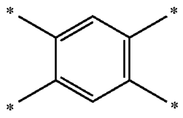

2-2a

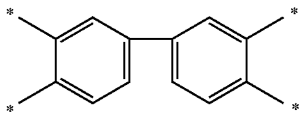

2-3a

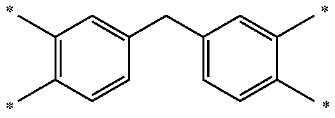

2-4a

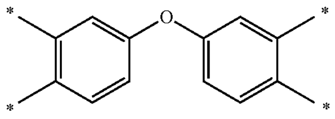

2-5a

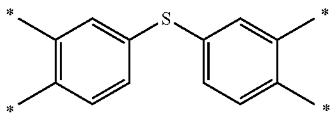

-continued 2-6a

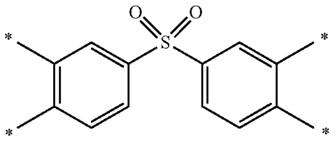

2-7a

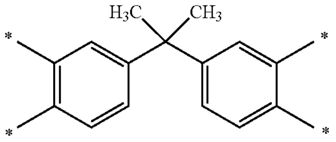

2-8a

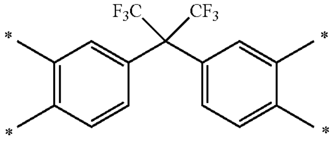

2-9a

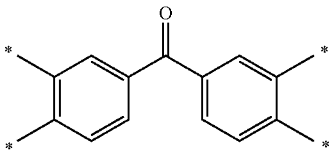

For example, G in Formula 2 may be the group represented by the above Formula 2-2a, the group represented by the above Formula 2-8a, or the group represented by the above Formula 2-9a.

In an embodiment, the dianhydride compound may comprise a compound having a fluorine-containing substituent, a compound having a biphenyl group, or a compound having a ketone group.

The fluorine-containing substituent may be a fluorinated hydrocarbon group and specifically may be a trifluoromethyl group. But it is not limited thereto.

In another embodiment, the dianhydride compound may be composed of a single component or a mixture of two components.

For example, the dianhydride compound may comprise at least one selected from the group consisting of 2,2'-bis-(3,4-dicarboxyphenyl)hexafluoropropane dianhydride (6FDA) and 3,3',4,4'-biphenyltetracarboxylic dianhydride (BPDA), which have the following structures, but it is not limited thereto.

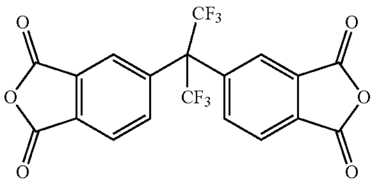

6-FDA

-continued

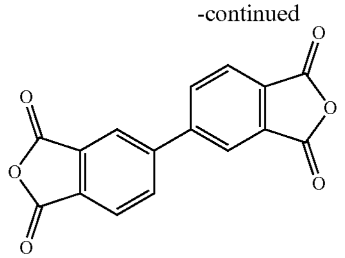

BPDA

The diamine compound and the dianhydride compound may be polymerized to form a polyamic acid.

Subsequently, the polyamic acid may be converted to a polyimide through a dehydration reaction, and the polyimide comprises an imide repeat unit.

The polyimide may form a repeat unit represented by the following Formula A.

[Formula A]

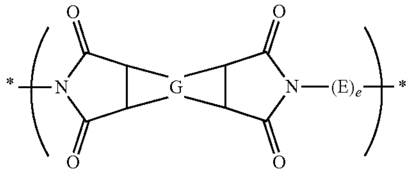

In Formula A, E, G, and e are as described above.

For example, the polyimide may comprise a repeat unit represented by the following Formula A-1, but it is not limited thereto.

[Formula A-1]

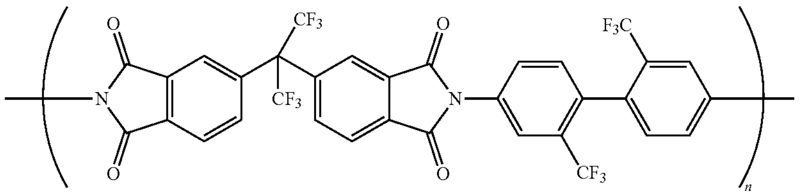

In Formula A-1, n is an integer of 1 to 400.

The dicarbonyl compound is not particularly limited, but it may be, for example, a compound represented by the following Formula 3.

[Formula 3]

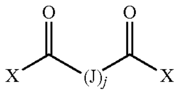

In Formula 3,

J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be Cl, but it is not limited thereto.

(A in the above Formula 3 may be selected from the groups represented by the following Formulae 3-1a to 3-14a, but it is not limited thereto.

3-1a

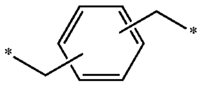

3-2a

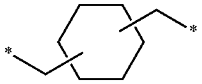

3-3a

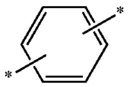

3-4a

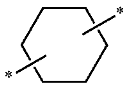

3-5a

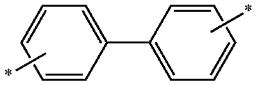

-continued 3-6a

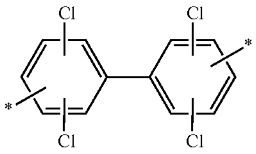

3-7a

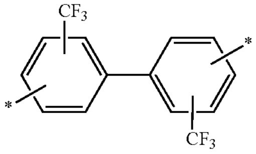

-continued 3-8a

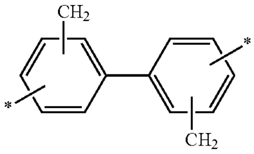

3-9a

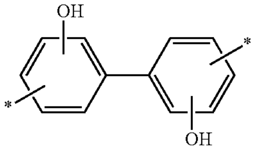

3-10a

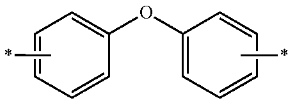

3-11a

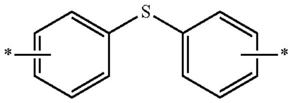

3-12a

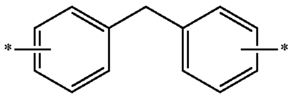

3-13a

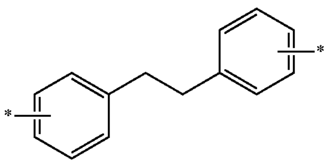

1-14a $*—(CH_2)_n—*$ (n is selected from integers of 1 to 12)

Specifically, $(J)_j$ in the above Formula 3 may be selected from the groups represented by the following Formulae 3-1b to 3-8b, but it is not limited thereto.

3-1b

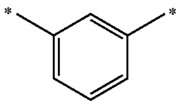

3-2b

3-3b

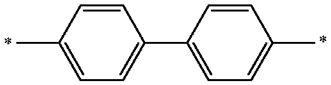

3-4b

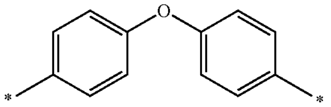

-continued 3-5b

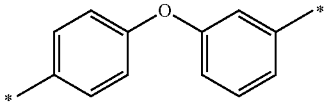

3-6b

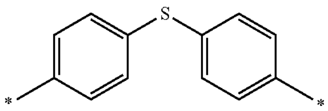

3-7b

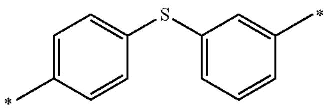

3-8b

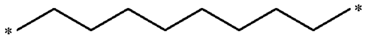

More specifically, $(J)_j$ in Formula 3 may be the group represented by the above Formula 3-1b, the group represented by the above Formula 3-2b, the group represented by the above Formula 3-3b, or the group represented by the above Formula 3-8b.

For example, $(J)_j$ in the above Formula 3 may be the group represented by the above Formula 3-1b or the group represented by the above Formula 3-2b.

In an embodiment, one kind of a dicarbonyl compound may be used alone, or a mixture of at least two kinds of dicarbonyl compounds different from each other may be used, as the dicarbonyl compound. If two or more dicarbonyl compounds are used, at least two dicarbonyl compounds in which $(J)_j$ in the above Formula 3 is selected from the groups represented by the above Formulae 3-1b to 3-8b may be used as the dicarbonyl compound.

In another embodiment, the dicarbonyl compound may be an aromatic dicarbonyl compound that contains an aromatic structure.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

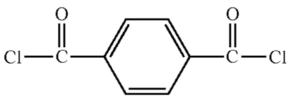

TPC

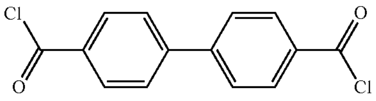

BPDC

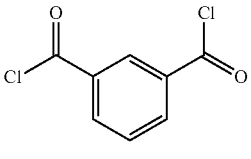

IPC

The diamine compound and the dicarbonyl compound may be polymerized to form a repeat unit represented by the following Formula B.

[Formula B]

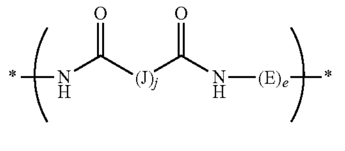

In Formula B, E, J, e, and j are as described above.

For example, the diamine compound and the dicarbonyl compound may be polymerized to form amide repeat units represented by the following Formulae B-1 and B-2.

Alternatively, the diamine compound and the dicarbonyl compound may be polymerized to form amide repeat units represented by the following Formulae B-2 and B-3.

[Formula B-1]

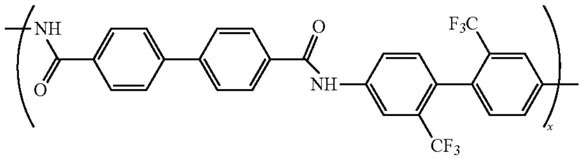

In Formula B-1, x is an integer of 1 to 400.

[Formula B-2]

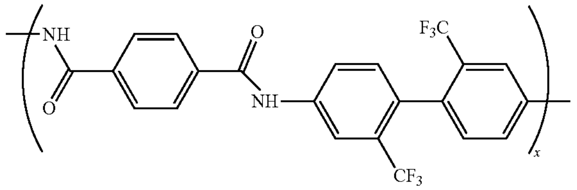

In Formula B-2, y is an integer of 1 to 400.

[Formula B-3]

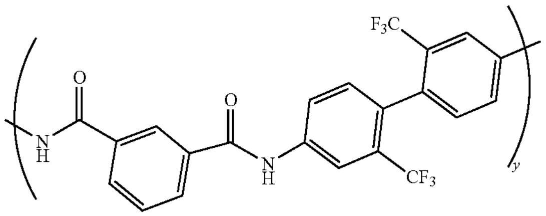

In Formula B-3, y is an integer of 1 to 400.

According to an embodiment, the polyamide-imide-based polymer may comprise a repeat unit represented by the following Formula A and a repeat unit represented by the following Formula B:

[Formula A]

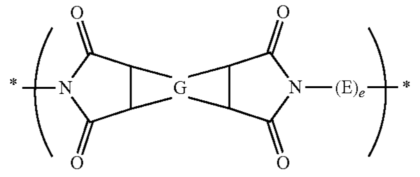

[Formula B]

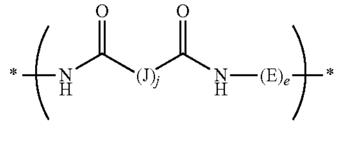

In Formulae A and B,

E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(═O)—, —CH(OH)—, —S(═O)$_2$—, —Si(CH$_3$)$_2$—, —C(CH$_3$)$_2$—, and —C(CF$_3$)$_2$—, e and j are each independently selected from integers of 1 to 5, when e is 2 or more, then the two or more Es are the same as, or different from, each other, when j is 2 or more, then the two or more Js are the same as, or different from, each other, G is a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group is present alone, fused to each other to form a condensed ring, or bonded by a bonding group selected from a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(═O)—, —CH(OH)—, —S(═O)$_2$—, —Si(CH$_3$)$_2$—, —C(CH$_3$)$_2$—, and —C(CF$_3$)$_2$—.

The polyamide-imide-based polymer may comprise an imide-based repeat unit and an amide-based repeat unit at a molar ratio of 2:98 to 70:30. Specifically, the molar ratio of the imide repeat unit to the amide repeat unit may be 2:98 to 60:40, 2:98 to 55:45, 2:98 to 50:50, 5:95 to 70:30, 5:95 to 60:40, 5:95 to 55:45, 5:95 to 50:50, or 10:90 to 40:60, but it is not limited thereto.

If the molar ratio of the imide repeat unit to the amide repeat unit is within the above range, it is possible to effectively control the content of nitrogen (N) elements of the polyamide-imide-based film and to enhance the quality reliability of the film in combination with the characteristic processing method.

In the polyamide-imide-based polymer, the molar ratio of the repeat unit represented by the above Formula A to the repeat unit represented by the above Formula B may be 2:98 to 70:30. Specifically, the molar ratio of the repeat unit represented by Formula A to the repeat unit represented by Formula B may be 2:98 to 60:40, 2:98 to 55:45, 2:98 to 50:50, 5:95 to 70:30, 5:95 to 60:40, 5:95 to 55:45, 5:95 to 50:50, or 10:90 to 40:60, but it is not limited thereto.

The polyamide-imide-based film according to an embodiment may further comprise at least one selected from the group consisting of a filler, a blue pigment, and a UVA absorber in addition to the polyamide-imide-base polymer.

The filler may comprise, for example, an oxide, a carbonate, or a sulfate of metal or metalloid. For example, the filler may comprise silica, calcium carbonate, barium sulfate, or the like, but it is not limited thereto.

The filler may be employed in the form of particles. In addition, the surface of the filler is not subjected to special coating treatment, and it may be uniformly dispersed in the entire film.

As the polyamide-imide-based film comprises the filler, it is possible to secure a wide angle of view without a deterioration in the optical properties of the film and to enhance not only the roughness and winderability but also the effect of improving the scratches caused by sliding in the preparation of the film.

The filler may have a refractive index of 1.55 to 1.75. Specifically, the refractive index of the filler may be 1.60 to 1.75, 1.60 to 1.70, 1.60 to 1.68, or 1.62 to 1.65, but it is not limited thereto.

If the refractive index of the filler satisfies the above range, the birefringence values related to x-direction refractive index (nx), y-direction refractive index (ny), and z-direction refractive index (nz) can be appropriately adjusted, and the luminance of the film at various angles can be improved.

On the other hand, if the refractive index of the filler is outside the above range, there may arise a problem in that the filler is visually noticeable on the film or that the haze is increased due to the filler.

The content of the filler may be 100 ppm to 15,000 ppm based on the total weight of the solids content of the polyamide-imide-based polymer. Specifically, the content of the filler may be 100 ppm to 14,500 ppm, 100 ppm to 14,200 ppm, 200 ppm to 14,500 ppm, 200 ppm to 14,200 ppm, 250 ppm to 14,100 ppm, or 300 ppm to 14,000 ppm, based on the total weight of the solids content of the polyamide-imide-based polymer, but it is not limited thereto.

If the content of the filler is outside the above range, the haze of the film is steeply increased, and the filler may aggregate with each other on the surface of the film, so that a feeling of foreign matter may be visually observed, or it may cause a trouble in the sliding performance or deteriorate the windability in the preparation process.

In some embodiments, the blue pigment may be employed in an amount of 50 to 5,000 ppm based on the total weight of the polyamide-imide-based polymer. Preferably, the blue pigment may be employed in an amount of 100 to 5,000 ppm, 200 to 5,000 ppm, 300 to 5,000 ppm, 400 to 5,000 ppm, 50 to 3,000 ppm, 100 to 3,000 ppm, 200 to 3,000 ppm, 300 to 3,000 ppm, 400 to 3,000 ppm, 50 to 2,000 ppm, 100 to 2,000 ppm, 200 to 2,000 ppm, 300 to 2,000 ppm, 400 to 2,000 ppm, 50 to 1,000 ppm, 100 to 1,000 ppm, 200 to 1,000 ppm, 300 to 1,000 ppm, or 400 to 1,000 ppm, based on the total weight of the polyamide-imide-based polymer, but it is not limited thereto.

The UVA absorber may comprise an absorber that absorbs electromagnetic waves of a wavelength of 10 to 400 nm used in the art. For example, the UVA absorber may comprise a benzotriazole-based compound. The benzotriazole-based compound may comprise an N-phenolic benzotriazole-based compound. In some embodiments, the N-phenolic benzotriazole-based compound may comprise N-phenolic benzotriazole in which the phenol group is substituted with an alkyl group having 1 to 10 carbon atoms. It may be substituted with two or more of the alkyl group, which may be linear, branched, or cyclic.

In some embodiments, the UVA absorber may be employed in an amount of 0.1 to 10% by weight based on the total weight of the polyamide-imide-based polymer. Preferably, the UVA absorber may be employed in an amount of 0.1 to 5% by weight, 0.1 to 3% by weight, 0.1 to 2% by weight, 0.5 to 10% by weight, 0.5 to 5% by weight, 0.5 to 3% by weight, 0.5 to 2% by weight, 1 to 10% by weight, 1 to 5% by weight, 1 to 3% by weight, or 1 to 2% by weight, relative to the total weight of the polyamide-imide-based polymer, but it is not limited thereto.

The physical properties of the polyamide-imide-based film as described above are based on a thickness of 40 μm to 80 μm. For example, the physical properties of the polyamide-imide-based film are based on a thickness of 50 μm.

The features on the components and properties of the polyamide-imide-based film as described above may be combined with each other.

In addition, the contents of the respective elements in the polyamide-imide-based film, the content of nitrogen (N) elements in the film, and the average values and deviation rates of transmittance, haze, yellow index, and modulus thereof as described above may be adjusted by combinations of the chemical and physical properties of the components, which constitute the polyamide-imide-based film, along with the specific conditions in each step of the process for preparing the polyamide-imide-based film to be described below.

For example, the compositions and contents of the components that constitute the polyamide-imide-based film, the type and content of additives, the polymerization conditions and thermal treatment conditions such as heat gradient in the film preparation process, and the like are all combined to achieve desired ranges of the contents of elements, the average values, deviations, and deviation rates of the respective physical properties in the transverse direction.

Cover Window for a Display Device

The cover window for a display device according to an embodiment comprises a polyamide-imide-based film and a functional layer.

The polyamide-imide-based film has a content of nitrogen (N) elements in the film of 6 to 7.5% by weight based on the sum of the weights of carbon (C), hydrogen (H), oxygen (O), and nitrogen (N) elements in the film.

According to an embodiment, the polyamide-imide-based film may have an $EC_A$ value of 15.9 or more as defined by the above Equation 1.

Details on the polyamide-imide-based film are as described above.

The cover window for a display device can be advantageously applied to a display device.

Display Device

The display device according to an embodiment comprises a display unit; and a cover window disposed on the display unit, wherein the cover window comprises a polyamide-imide-based film and a functional layer.

The polyamide-imide-based film has a content of nitrogen (N) elements in the film of 6 to 7.5% by weight based on the sum of the weights of carbon (C), hydrogen (H), oxygen (O), and nitrogen (N) elements in the film.

According to an embodiment, the polyamide-imide-based film may have an $EC_A$ value of 15.9 or more as defined by the above Equation 1.

Details on the polyamide-imide-based film and the cover window are as described above.

Figure 2:
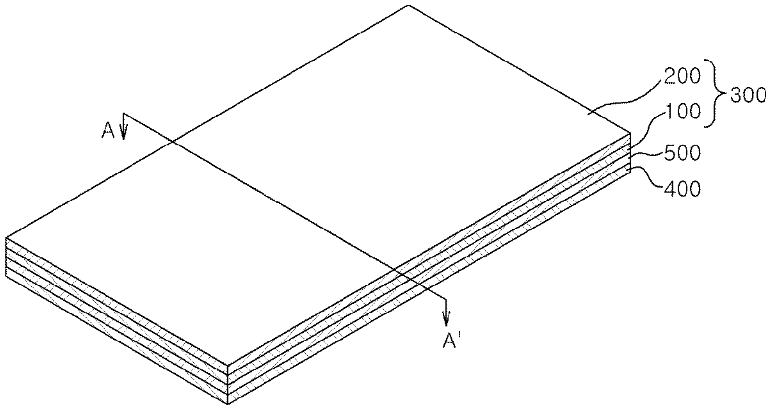
FIG. 2 is a schematic perspective view of a display device according to an embodiment.
Figure 3:
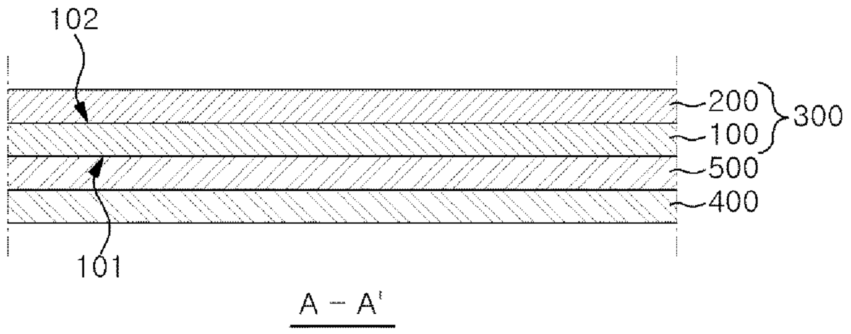
FIG. 3 is a schematic cross-sectional view of a display device according to an embodiment.

FIG. 1 is a schematic exploded view of a display device according to an embodiment. FIG. 2 is a schematic perspective view of a display device according to an embodiment. FIG. 3 is a schematic cross-sectional view of a display device according to an embodiment.

Specifically, FIGS. 1 to 3 illustrate a display device, which comprises a display unit (400) and a cover window (300) disposed on the display unit (400), wherein the cover window comprises a polyamide-imide-based film (100) having a first side (101) and a second side (102) and a functional layer (200), and an adhesive layer (500) is interposed between the display unit (400) and the cover window (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel may display an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the cover window (300). The adhesive layer may be an optically transparent adhesive layer, but it is not particularly limited.

The cover window (300) may be disposed on the display unit (400). The cover window is located at the outer position of the display device to thereby protect the display unit.

The cover window (300) may comprise a polyamide-imide-based film and a functional layer. The functional layer may be at least one selected from the group consisting of a hard coating, a reflectance reducing layer, an antifouling layer, and an antiglare layer. The functional layer may be coated on at least one side of the polyamide-imide-based film.

The polyamide-imide-based film according to an embodiment can be applied in the form of a film to the outside of a display device without changing the display driving method, the color filter inside the panel, or the laminated structure, thereby providing a display device having a uniform thickness, low haze, high transmittance, and high transparency. Since neither significant process changes nor cost increases are needed, it is advantageous in that the production costs can be reduced.

The polyamide-imide-based film according to an embodiment may be excellent in optical properties in terms of high transmittance, low haze, and low yellow index, as well as may have excellent mechanical properties such as modulus and flexibility, and the change (deterioration) of its optical and mechanical properties can be suppressed when it is exposed to UV rays.

Specifically, the polyamide-imide-based film having a content of nitrogen (N) elements within the above range has little variation in the physical properties in the TD direction, whereby its quality is uniform, and it can have excellent mechanical properties, optical properties, and thermal resistance. As a result, when the polyamide-imide-based film is applied to a cover window for a display device or to a display device, the quality reliability and product yield of a final product can be enhanced.

Process for Preparing a Polyamide-Imide-Based Film

An embodiment provides a process for preparing a polyamide-imide-based film.

Figure 4:
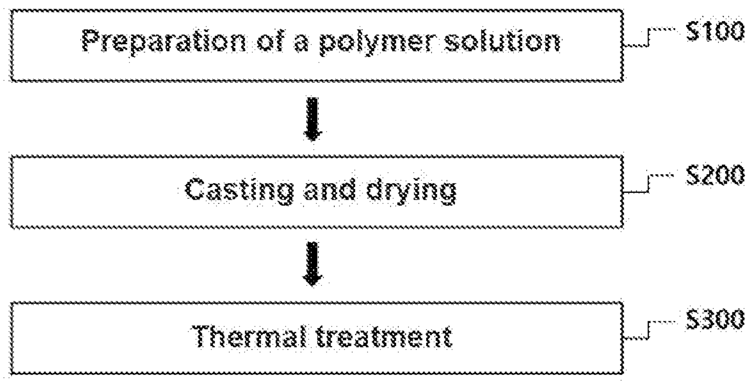
FIG. 4 is a schematic flow diagram of a process for preparing a polyamide-imide-based film according to an embodiment.

The process for preparing a polyamide-imide-based film according to an embodiment comprises polymerizing a diamine compound, a dianhydride compound, and a dicarbonyl compound in an organic solvent to prepare a polyamide-imide-based polymer solution (S100); casting the solution and then drying it to prepare a gel sheet (S200); and thermally treating the gel sheet (S300) (see FIG. 4).

The process for preparing a polyamide-imide-based film according to some embodiments may further comprise adjusting the viscosity of the polyamide-imide-based polymer solution (S110), aging the polyamide-imide-based polymer solution (S120), and/or degassing the polyamide-imide-based polymer solution (S130).

The polyamide-imide-based film is a film in which a polyamide-imide-based polymer is a main component. The polyamide-imide-based polymer is a resin that comprises an imide repeat unit and an amide repeat unit at a predetermined molar ratio as a structural unit.

In the process for preparing a polyamide-imide-based film, a polymer solution for preparing the polyamide-imide-based polymer may be prepared by simultaneously or sequentially mixing a diamine compound, a dianhydride compound, and a dicarbonyl compound in an organic solvent in a reactor, and reacting the mixture (S100).

In an embodiment, the polymer solution may be prepared by simultaneously mixing and reacting a diamine compound, a dianhydride compound, and a dicarbonyl compound in an organic solvent.

In another embodiment, the step of preparing the polymer solution may comprise first mixing and reacting the diamine compound and the dianhydride compound in a solvent to produce a polyamic acid (PAA) solution; and second mixing and reacting the polyamic acid (PAA) solution and the dicarbonyl compound to form an amide bond and an imide bond. The polyamic acid solution is a solution that comprises a polyamic acid.

Alternatively, the step of preparing the polymer solution may comprise first mixing and reacting the diamine compound and the dianhydride compound in a solvent to produce a polyamic acid solution; subjecting the polyamic acid solution to dehydration to produce a polyimide (PI) solution; and second mixing and reacting the polyimide (PI) solution and the dicarbonyl compound to further form an amide bond. The polyimide solution is a solution that comprises a polymer having an imide repeat unit.

In still another embodiment, the step of preparing the polymer solution may comprise first mixing and reacting the diamine compound and the dicarbonyl compound in a solvent to produce a polyamide (PA) solution; and second mixing and reacting the polyamide (PA) solution and the dianhydride compound to further form an imide bond. The polyamide solution is a solution that comprises a polymer having an amide repeat unit.

The polymer solution thus prepared may be a solution that comprises a polymer containing at least one selected from the group consisting of a polyamic acid (PAA) repeat unit, a polyamide (PA) repeat unit, and a polyimide (PI) repeat unit.

Alternatively, the polymer contained in the polymer solution comprises an imide repeat unit derived from the polymerization of the diamine compound and the dianhydride compound and an amide repeat unit derived from the polymerization of the diamine compound and the dicarbonyl compound.

Details on the diamine compound, the dianhydride compound, and the dicarbonyl compound are as described above.

The content of solids contained in the polymer solution may be 10% by weight to 30% by weight. Alternatively, the content of solids contained in the polymer solution may be 15% by weight to 25% by weight, but it is not limited thereto.

If the content of solids contained in the polymer solution is within the above range, a polyamide-imide-based film can be effectively produced in the extrusion and casting steps. In addition, the polyamide-imide-based film thus prepared exhibits similar thermal properties in the directions of the film, whereby its quality is uniform, and it can have excellent mechanical properties, optical properties, and thermal resistance.

In another embodiment, the step of preparing the polymer solution may further comprise introducing a catalyst.

Here, the catalyst may comprise at least one selected from the group consisting of beta picoline, acetic anhydride, isoquinoline (IQ), and pyridine-based compounds, but it is not limited thereto.

The catalyst may be added in an amount of 0.01 to 0.5 molar equivalent, 0.01 to 0.4 molar equivalent, or 0.01 to 0.3 molar equivalent, based on 1 mole of the polyamic acid, but it is not limited thereto.

The further addition of the catalyst may expedite the reaction rate and enhance the chemical bonding force between the repeat unit structures or that within the repeat unit structures.

In an embodiment, the step of preparing the polymer solution may further comprise adjusting the viscosity of the polymer solution (S110). The viscosity of the polymer solution may be 80,000 cps to 500,000 cps, 100,000 cps to 500,000 cps, 150,000 cps to 500,000 cps, 150,000 cps to 450,000 cps, 200,000 cps to 450,000 cps, 200,000 cps to 400,000 cps, 200,000 cps to 350,000 cps, or 250,000 cps to 350,000 cps at room temperature. In such an event, the film-forming capability of a polyamide-imide-based film can be enhanced, thereby enhancing the thickness uniformity.

Specifically, the step of preparing the polymer solution may comprise simultaneously or sequentially mixing and reacting a diamine compound, a dianhydride compound, and a dicarbonyl compound in an organic solvent to prepare a first polymer solution; and further adding the dicarbonyl compound to prepare a second polymer solution having the target viscosity.

In the steps of preparing the first polymer solution and the second polymer solution, the polymer solutions have viscosities different from each other. For example, the second polymer solution has a viscosity higher than that of the first polymer solution.

In the steps of preparing the first polymer solution and the second polymer solution, the stirring speeds may be different from each other. For example, the stirring speed when the first polymer solution is prepared may be faster than the stirring speed when the second polymer solution is prepared.

In still another embodiment, the step of preparing the polymer solution may further comprise adjusting the pH of the polymer solution. In this step, the pH of the polymer solution may be adjusted to 4 to 7, for example, 4.5 to 7.

The pH of the polymer solution may be adjusted by adding a pH adjusting agent. The pH adjusting agent is not particularly limited and may include, for example, amine-based compounds such as alkoxyamine, alkylamine, and alkanolamine.

As the pH of the polymer solution is adjusted to the above range, it is possible to prevent the occurrence of defects in the film produced from the polymer solution and to achieve the desired optical properties and mechanical properties in terms of yellow index and modulus.

The pH adjusting agent may be employed in an amount of 0.1% by mole to 10% by mole based on the total number of moles of monomers in the polymer solution.

In an embodiment, the organic solvent may be at least one selected from the group consisting of dimethylformamide (DMF), dimethylacetamide (DMAc), N-methyl pyrrolidone (NMP), m-cresol, tetrahydrofuran (THF), and chloroform. The organic solvent employed in the polymer solution may be dimethylacetamide (DMAc), but it is not limited thereto.

In another embodiment, at least one selected from the group consisting of a filler, a blue pigment, and a UVA absorber may be added to the polymer solution.

Details on the types and contents of the filler, blue pigment, and UVA absorber are as described above. The filler, blue pigment, and UVA absorber may be mixed with the polyamide-imide-based polymer in the polymer solution.

The polymer solution may be stored at −20° C. to 20° C., −20° C. to 10° C., −20° C. to 5° C., −20° C. to 0° C., or 0° C. to 10° C.

If it is stored at the above temperature, it is possible to prevent degradation of the polymer solution and to lower the moisture content to thereby prevent defects of a film produced therefrom.

In some embodiments, the polymer solution or the polymer solution whose viscosity has been adjusted may be aged (S120).

The aging may be carried out by leaving the polymer solution at a temperature of −10 to 10° C. for 24 hours or longer. In such an event, the polyamide-imide-based polymer or unreacted materials contained in the polymer solution, for example, may complete the reaction or achieve chemical equilibrium, whereby the polymer solution may be homogenized. The mechanical properties and optical properties of a polyamide-imide-based film formed therefrom may be substantially uniform over the entire area of the film. Preferably, the aging may be carried out at a temperature of −5 to 10° C., −5 to 5° C., or −3 to 5° C., but it is not limited thereto.

In an embodiment, the process may further comprise degassing the polyamide-imide-based polymer solution (S130). The step of degassing may remove moisture in the polymer solution and reduce impurities, thereby increasing the reaction yield and imparting excellent surface appearance and mechanical properties to the film finally produced.

The degassing may comprise vacuum degassing or purging with an inert gas.

The vacuum degassing may be carried out for 30 minutes to 3 hours after depressurizing the internal pressure of the tank in which the polymer solution is contained to 0.1 bar to 0.7 bar. The vacuum degassing under these conditions may reduce bubbles in the polymer solution. As a result, it is possible to prevent surface defects of the film produced therefrom and to achieve excellent optical properties such as haze.

In addition, the purging may be carried out by purging the tank with an inert gas at an internal pressure of 1 atm to 2 atm. The purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The vacuum degassing and the purging with an inert gas may be carried out in separate steps.

For example, the step of vacuum degassing may be carried out, followed by the step of purging with an inert gas, but it is not limited thereto.

The vacuum degassing and/or the purging with an inert gas may improve the physical properties of the surface of a polyamide-imide-based film thus produced.

The polymer solution may be cast to prepare a gel sheet (S200).

For example, the polymer solution may be extruded, coated, and/or dried on a support to form a gel sheet.

In addition, the casting thickness of the polymer solution may be 200 μm to 700 μm. As the polymer solution is cast to a thickness within the above range, the final film produced after the drying and thermal treatment may have an appropriate and uniform thickness.

The polymer solution may have a viscosity of 150,000 cps to 500,000 cps at room temperature as described above. As the viscosity satisfies the above range, the polymer solution can be cast to a uniform thickness without defects, and a polyamide-imide-based film having a substantially uniform thickness can be formed without local/partial thickness variations during drying.

The polymer solution is cast and then dried at a temperature of 60° C. to 150° C., 70° C. to 150° C., 80° C. to 150° C., or 90° C. to 150° C., for 5 minutes to 60 minutes to prepare a gel sheet. Specifically, the polymer solution is dried at a temperature of 90° C. to 140° C. for 15 minutes to 40 minutes to prepare a gel sheet.

The solvent of the polymer solution may be partially or totally volatilized during the drying to prepare the gel sheet.

The dried gel sheet may be thermally treated to form a polyamide-imide-based film (S300).

The thermal treatment of the gel sheet may be carried out, for example, through a thermosetting device.

The step of thermally treating the gel sheet comprises thermal treatment through at least one heater.

In addition, the step of thermally treating the gel sheet may further comprise thermal treatment with hot air.

In an embodiment, the step of thermally treating the gel sheet may comprise thermal treatment with hot air; and thermal treatment through at least one heater.

In an embodiment, if the thermal treatment with hot air is carried out, heat may be uniformly supplied. If heat is not uniformly supplied, a satisfactory surface roughness cannot be achieved, or the surface quality may not be uniform, and the surface energy may be raised or lowered too much.

The thermal treatment with hot air may be carried out in a temperature range of 60° C. to 500° C. for 5 minutes to 200 minutes. Specifically, the thermal treatment of the gel sheet may be carried out in a temperature range of 80° C. to 300° C. at a temperature elevation rate of 1.5° C./minute to 20° C./minute for 10 minutes to 150 minutes. More specifically, the thermal treatment of the gel sheet may be carried out in a temperature range of 140° C. to 250° C.

In such an event, the initial temperature of the thermal treatment of the gel sheet may be 60° C. or higher. Specifically, the initial temperature of the thermal treatment of the gel sheet may be 80° C. to 180° C. In addition, the maximum temperature in the thermal treatment may be 200° C. to 500° C.

In addition, the thermal treatment of the gel sheet may be carried out in two or more stages. Specifically, the thermal treatment of the gel sheet with hot air may be carried out sequentially in a first hot air treatment stage and a second hot air treatment stage. The temperature in the second hot air treatment stage may be higher than the temperature in the first hot air treatment stage.

In an embodiment, the step of thermally treating the gel sheet may comprise thermal treatment through at least one heater, specifically, thermal treatment through a plurality of heaters.

Figure 5:
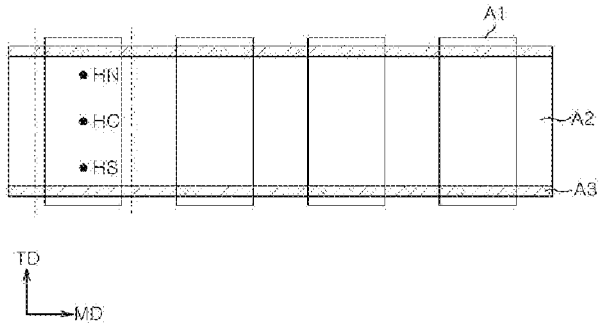
FIG. 5 is a plan view schematically illustrating the step of passing a polyamide-imide-based film according to an embodiment through a heater in the process for preparing the same.
Figure 6:
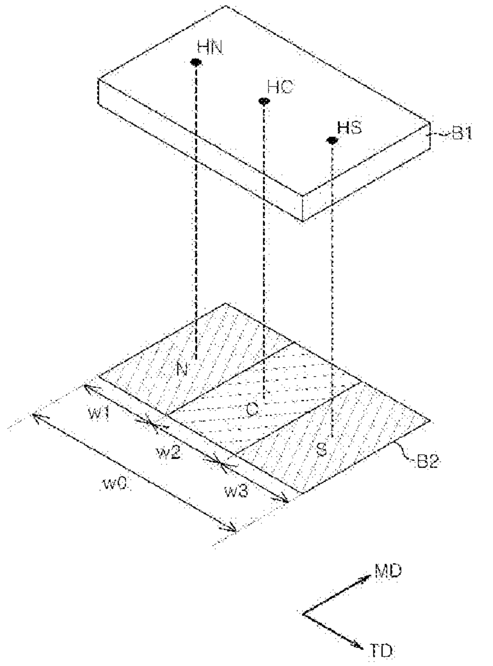
FIG. 6 is a perspective view schematically illustrating the heater-mounting part and the gel sheet in the step of passing a polyamide-imide-based film according to an embodiment through a heater in the process for preparing the same.

As an example, referring to FIGS. 5 and 6, the plurality of heaters may comprise a first heater (HC), a second heater (HN), and a third heater (HS) spaced apart in the TD direction of the gel sheet (polyamide-imide-based film). The first heater (HC) may be mounted on the heater mounting part (A1, B1) to correspond to the center of the gel sheet, the second heater (HN) may be mounted on the heater mounting part (A1, B1) to correspond to any one of both ends of the gel sheet, and the third heater (HS) may be mounted on the heater mounting part (A1, B1) to correspond to the other of both ends of the gel sheet. That is, the first heater HC may be mounted on the heater mounting part (A1, B1) to be positioned between the second heater (HN) and the third heater (HS). The heater mounting part (A1, B1) may be provided to face the gel sheet. As an example, the heater mounting part (A1, B1) may be provided to face the gel sheet and spaced apart therefrom. Preferably, the distance between the first heater (HC) and the second heater (HN) may be the same as the distance between the first heater (HC) and the third heater (HS). Two or more of the heater mounting part (A1, B1) may be disposed along the traveling direction (or longitudinal direction) of the gel sheet (polyamide-imide-based film).

The at least one heater may comprise an IR heater. However, the type of the at least one heater is not limited to the above example and may be variously changed.

Specifically, the plurality of heaters may each comprise an IR heater. More specifically, the first heater, the second heater, and the third heater may each comprise an IR heater.

The thermal treatment by the at least one heater may be carried out in a temperature range of 300° C. or higher. Specifically, the thermal treatment by the at least one heater may be carried out for 1 minute to 30 minutes or 1 minute to 20 minutes in a temperature range of 300° C. to 500° C.

Referring to FIG. 6, the heater mounting part (B1) and the gel sheet (B2) are positioned in parallel, and the heater mounting part (B1) is spaced apart by a specific distance from the gel sheet (B2) disposed on a belt (A3).

The gel sheet (B2) comprises three regions (N region, C region, and S region) partitioned in the TD direction. In the three partitioned regions, region C is a region located in the middle of the gel sheet, and region N and region S are regions located at the ends of the gel sheet.

When the width of region N is w1, the width of region C is w2, and the width of region S is w3, the width (w0) of the gel sheet is equal to the sum of w1, w2, and w3.

In addition, regarding the widths of the three partitioned regions, the width ratio of w1:w2:w3 may be 1:0.5 to 1.5:1. Specifically, the widths of the three partitioned regions may satisfy w1=w2=w3.

The heater mounting part (B1) is positioned parallel to, and spaced apart by a specific distance from, the gel sheet (B2). A region corresponding to region N of the gel sheet (B2) among the heater mounting part (B1) comprises the second heater (HN), a region corresponding to region C of the gel sheet (B2) among the heater mounting part (B1) comprises the first heater (HC), and a region corresponding to region S of the gel sheet (B2) among the heater mounting part (B1) comprises the third heater (HS).

In an embodiment, in the step of thermal treatment through the at least one heater, in the heater mounting part in which three heaters spaced apart in the TD direction of the gel sheet are positioned, when the temperature of the first heater (HC) is $T_{HC}$, and the temperatures of the second heater (HN) and the third heater (HS) are $T_{HN}$ and $T_{HS}$, respectively, $T_{HN}$ and $T_{HS}$ are higher than $T_{HC}$.

In another embodiment, the step of thermally treating the gel sheet comprises thermally treating it through a first heater, a second heater, and a third heater spaced apart in the TD direction of the gel sheet, and when the temperature of the first heater corresponding to the center of the gel sheet is $T_{HC}$, and when the temperatures of the second heater and the third heater corresponding to both ends of the gel sheet are $T_{HN}$ and $T_{HS}$, respectively, $T_{HN}$ and $T_{HS}$ are higher than $T_{HC}$.

Specifically, $T_{HC}$ is 300° C. to 360° C., 300° C. to 350° C., or 310° C. to 350° C.

$T_{HN}$ and $T_{HS}$ are 310° C. to 420° C., 330° C. to 420° C., or 340° C. to 400° C.

$T_{HN}$ and $T_{HS}$ are higher than $T_{HC}$ by 2% to 18%, 3% to 18%, 5% to 15%, 8% to 15%, 10% to 20%, or 10% to 15%.

In the step of thermal treatment through the at least one heater, as a temperature gradient as described above is applied between the heaters, it is possible to control the content ratios of elements in a desired range, and it is possible to achieve similar thermal properties in the directions of the film. In addition, the thermal properties of the film, as well as other mechanical and optical properties such as transmittance, haze, yellow index, and modulus, have almost no variation in the TD direction of the film. Since it has little variation in the physical properties depending on the directions, a film of uniform quality can be obtained.

Subsequently, after the step of thermal treatment of the gel sheet, a step of cooling the cured film may be carried out while it is moved.

The step of cooling the cured film while it is transferred may comprise a first temperature lowering step of lowering the temperature at a rate of 100° C./minute to 1,000° C./minute and a second temperature lowering step of lowering the temperature at a rate of 40° C./minute to 400° C./minute.

In such an event, specifically, the second temperature lowering step is performed after the first temperature lowering step. The temperature lowering rate of the first temperature lowering step may be faster than the temperature lowering rate of the second temperature lowering step.

For example, the maximum rate of the first temperature lowering step is faster than the maximum rate of the second temperature lowering step. Alternatively, the minimum rate of the first temperature lowering step is faster than the minimum rate of the second temperature lowering step.

If the step of cooling the cured film is carried out in such a multistage manner, it is possible to have the physical properties of the cured film further stabilized and to maintain the optical properties and mechanical properties of the film achieved during the curing step more stably for a long period of time.

In addition, a step of winding the cooled cured film using a winder may be carried out.

In such an event, the ratio of the moving speed of the gel sheet on the belt at the time of drying to the moving speed of the cured film at the time of winding is 1:0.95 to 1:1.40. Specifically, the ratio of the moving speeds may be 1:0.99 to 1:1.20, 1:0.99 to 1:1.10, or 1:1.0 to 1:1.05, but it is not limited thereto.

If the ratio of the moving speeds is outside the above range, the mechanical properties of the cured film may be impaired, and the flexibility and elastic properties may be deteriorated.

In the process for preparing a polyamide-imide-based film, the thickness deviation (%) according to the following Relationship 1 may be 3% to 30%. Specifically, the thickness deviation (%) may be 5% to 20%, but it is not limited thereto.

$$\text{Thickness deviation (\%)}=(M1-M2)/M2\times 100 \quad \text{[Relationship 1]}$$

In Relationship 1, M1 is the thickness (μm) of the gel sheet, and M2 is the thickness (μm) of the cooled cured film at the time of winding.

The polyamide-imide-based film is prepared by the preparation process as described above such that it is excellent in optical and mechanical properties, as well as it has uniform quality with isotropy. The polyamide-imide-based film may be applicable to various uses that require flexibility and transparency. For example, the polyamide-imide-based film may be applied to not only display devices but also solar cells, semiconductor devices, sensors, and the like.

Details on the polyamide-imide-based film prepared by the process for preparing a polyamide-imide film are as described above.

Embodiments for Carrying Out the Invention

Hereinafter, the above description will be described in detail by referring to examples. However, these examples are set forth to illustrate the present invention, and the scope of the present invention is not limited thereto.

Example 1

A temperature-controllable reactor was charged with dimethylacetamide (DMAc) as an organic solvent at 10° C. under a nitrogen atmosphere. Then, 2,2'-bis(trifluoromethyl)-4,4'-diaminobiphenyl (TFMB) as an aromatic diamine was slowly added thereto and dissolved.

Thereafter, 2,2'-bis(3,4-dicarboxyphenyl)hexafluoropropane dianhydride (6-FDA) as a dianhydride was slowly added thereto, and the mixture was stirred for 2 hours.

Then, as a dicarbonyl compound, terephthaloyl chloride (TPC) was added, followed by stirring for 1 hour; and isophthaloyl chloride (IPC) was added, followed by stirring for 1 hour, thereby preparing a polymer solution.

The polymer solution thus obtained was coated onto a substrate and then dried in a temperature range of 90° C. to 140° C. to prepare a gel sheet.

Thereafter, the gel sheet was treated with hot air at a temperature of 140° C. to 250° C. as a first thermal treatment step. Subsequently, a step of passing the gel sheet through a plurality of heaters with a temperature gradient in the TD direction was carried out as a second thermal treatment step thereof. Here, IR heaters (IR heaters having a maximum temperature of 1,200° C.) were used as the plurality of heaters. Specifically, the gel sheet was passed through the heater mounting part in which three spaced heaters were located in the TD direction of the film to obtain a polyamide-imide-based film having a thickness of 50 Here, the temperature of the heater (first heater) located in the middle was set to 330° C. ($T_{HC}$), and the temperature of the two heaters (second heater and third heater) located at both ends of the heater mounting part was set to 379.5° C. ($T_{HN}$, $T_{HS}$, $1.15T_{HC}$), which is 15% higher than the temperature of the heater located in the middle.

The specific composition and molar ratio of the polyamide-imide-based polymer are described in the Preparation Examples of Table 1 below. In addition, the content of each element in the film thus prepared was measured using an element analyzer (model name: Flash2000 (Thermo Fisher Scientific, Germany)) to measure the content of nitrogen (N), carbon (C), oxygen (O), and hydrogen (H) elements.

Examples 2 and 3 and Comparative Examples 1 to 3

As shown in Tables 1 and 2 below, films were each prepared in the same manner as in Example 1, except that the composition and molar ratio of the polymer, the temperature of the heaters in the step of passing it through the plurality of heaters, and the degree of temperature gradient in the TD direction were changed.

<Preparation Example> Composition of a Polymer

TABLE 1

| | | Prep. Ex. 1 | Prep. Ex. 2 | Prep. Ex. 3 |
|---|---|---|---|---|
| Polymerization ratio of the polyamide-imide-based polymer | Diamine compound (molar ratio) | TFMB 100 | TFMB 100 | TFMB 100 |
| | Dianhydride compound (molar ratio) | 6FDA 10 | 6FDA 10<br>BPDA 10 | 6FDA 20<br>BPDA 20 |
| | Dicarbonyl compound (molar ratio) | TPC 70<br>IPC 20 | TPC 80 | TPC 60 |

TABLE 2

| | | Heater temperature condition | | | Content ratio of elements in the film | | | |
|---|---|---|---|---|---|---|---|---|
| | Composition | $T_{HC}$ (° C.) | $T_{HN}$, $T_{HS}$ (° C.) | Temp. gradient | N/(CHON) (%) | N/(total weight of film) (%) | N relative to 100 parts by weight of C (part by weight) | (N + H)/(total weight of film) (%) |
| Ex. 1 | Prep. Ex. 1 | 330 | 379.5 | 15% | 7.22 | 5.97 | 10.43 | 8.74 |
| Ex. 2 | Prep. Ex. 2 | 330 | 379.5 | 15% | 6.32 | 5.28 | 9.05 | 7.45 |
| Ex. 3 | Prep. Ex. 3 | 330 | 379.5 | 15% | 6.84 | 5.63 | 9.97 | 7.84 |
| C. Ex. 1 | Prep. Ex. 1 | 330 | 330 | × | 8.49 | 7.02 | 12.42 | 9.64 |
| C. Ex. 2 | Prep. Ex. 2 | 330 | 330 | × | 8.87 | 7.42 | 13.53 | 10.27 |
| C. Ex. 3 | Prep. Ex. 3 | 330 | 330 | × | 7.56 | 6.22 | 11.34 | 8.87 |

TABLE 3

| | Content ratio of elements in the film | | | | |
|---|---|---|---|---|---|
| | 22C/(2O + 12H + 2N) $EC_A$ | 33C/(4O + 12H + 2N) $EC_B$ | 30C/(4O + 12H + 2N) $EC_C$ | (C + O)/N $EC_D$ | C/ (CHON) (%) |
| Ex. 1 | 16.01 | 16.85 | 15.32 | 12.39 | 69.20 |
| Ex. 2 | 17.80 | 17.89 | 16.27 | 14.41 | 69.84 |
| Ex. 3 | 16.84 | 16.98 | 15.44 | 13.23 | 68.62 |
| C. Ex. 1 | 15.85 | 16.74 | 15.22 | 10.40 | 68.39 |
| C. Ex. 2 | 14.03 | 14.72 | 13.38 | 9.88 | 65.60 |
| C. Ex. 3 | 14.84 | 15.29 | 13.90 | 11.80 | 66.68 |

EVALUATION EXAMPLE

The films prepared in the Examples and Comparative Examples were each measured and evaluated for the following properties. The results are shown in Tables 4 and 5 below.

Evaluation Example 1: Measurement of Film Thickness

A digital micrometer 547-401 of Mitsutoyo, Japan, was used to measure the thickness at six points in total, in which two arbitrary points were selected in each of region N, region C, and region S, to calculate the average thickness, thickness deviation, and thickness deviation rate thereof.

Evaluation Example 2: Measurement of Transmittance and Haze

The light transmittance and haze were measured using a haze meter NDH-5000W manufactured by Nippon Denshoku Kogyo in accordance with the JIS K 7136 standard.

Evaluation Example 3: Measurement of Yellow Index

The yellow index (YI) was measured with a spectrophotometer (UltraS can PRO, Hunter Associates Laboratory) under the conditions of d65 and 10° in accordance with the ASTM-E313 standard.

Evaluation Example 4: Measurement of Modulus and Elongation

A sample was cut out by at least 10 cm in the direction perpendicular to the main shrinkage direction of the film and by 10 mm in the main shrinkage direction. It was fixed by the clips disposed at an interval of 10 cm in a universal testing machine UTM 5566A of Instron. A stress-strain curve was obtained until the sample was fractured while it was stretched at a speed of 10 mm/minute at room temperature. The slope of the load with respect to the initial strain on the stress-strain curve was taken as the modulus (GPa). In addition, the rate of change of the deformed length at break relative to the initial length was taken as the elongation (%).

With respect to the measurements of modulus and elongation, they were measured with the MD direction and the TD direction of the film as the longitudinal direction, respectively. The value measured with the TD direction as the longitudinal direction was divided by the value measured with the MD direction as the longitudinal direction, and the ratio was then obtained by multiplying by 100. The respective values ($R_{MO}$ and $R_{EL}$) are shown in Table 5 below.

Evaluation Example 5: Evaluation of Light Resistance

The film was irradiated with a UV-A lamp (wavelength 340 nm) at 0.63 W/m$^2$ at 60° C. for 72 hours using QUV/Spray/RP equipment of Q-Lab, and the yellow index was measured again by the method according to Evaluation Example 3 above, and the amount of change in yellow index (ΔYI) was calculated. The smaller the amount of change in yellow index, the better the light resistance.

Evaluation Example 6: Evaluation of Solvent Resistance

A film sample (5 cm×15 cm) having regions N, C, and S was immersed in a solvent for 5 seconds, dried at 80° C. for 3 minutes, and measured for the haze again by the method according to Evaluation Example 2 above, and the average value of the amounts of change in haze (ΔHz) of the film sample in the three regions was calculated. The smaller the amount of change in haze, the better the solvent resistance. MIBK or IPA was used as the solvent.

In addition, the thickness, transmittance, haze, yellow index, and modulus of the film were measured at six points in total, in which two arbitrary points were selected in each of region N, region C, and region S of the prepared film, and their average, deviation, and deviation rate were each calculated and are shown in Table 4. The deviation rate is a value calculated by dividing the deviation by the average value and then multiplying by 100.

TABLE 4

| | | Evaluation Example | | | | |
|---|---|---|---|---|---|---|
| | Value | Thickness (μm) | TT (%) | Haze (%) | YI | Modulus (MD) (GPa) |
| Ex. 1 | Avg. | 49.8 | 89.1 | 0.33 | 2.52 | 6.62 |
| | Deviation | 1.2 | 0.1 | 0.02 | 0.11 | 0.18 |
| | Deviation rate | 2.41% | 0.11% | 6.06% | 4.37% | 2.71% |
| Ex. 2 | Avg. | 50.2 | 89 | 0.41 | 2.86 | 6.41 |
| | Deviation | 0.8 | 0.2 | 0.03 | 0.17 | 0.13 |
| | Deviation rate | 1.59% | 0.22% | 7.32% | 5.94% | 2.03% |
| Ex. 3 | Avg. | 50.1 | 89.2 | 0.28 | 3.11 | 6.28 |
| | Deviation | 0.9 | 0.1 | 0.02 | 0.15 | 0.17 |
| | Deviation rate | 1.80% | 0.11% | 7.14% | 4.82% | 2.71% |
| C. Ex. 1 | Avg. | 48.5 | 88.9 | 0.45 | 2.37 | 6.52 |
| | Deviation | 1.8 | 0.3 | 0.04 | 0.41 | 0.51 |
| | Deviation rate | 3.71% | 0.34% | 8.89% | 17.30% | 7.82% |

TABLE 4-continued

| | Evaluation Example | | | | | |
|---|---|---|---|---|---|---|
| | Value | Thickness (μm) | TT (%) | Haze (%) | YI | Modulus (MD) (GPa) |
| C. Ex. 2 | Avg. | 49.9 | 89 | 0.38 | 2.61 | 6.35 |
| | Deviation | 1.7 | 0.3 | 0.04 | 0.33 | 0.48 |
| | Deviation rate | 3.41% | 0.34% | 10.53% | 12.64% | 7.56% |
| C. Ex. 3 | Avg. | 51.8 | 88.8 | 0.49 | 2.95 | 6.16 |
| | Deviation | 1.9 | 0.4 | 0.05 | 0.48 | 0.71 |
| | Deviation rate | 3.67% | 0.45% | 10.20% | 16.27% | 11.53% |

TABLE 5

| | Evaluation Example | | | | | | | | | |
|---|---|---|---|---|---|---|---|---|---|---|
| | Modulus (GPa) | | | Elongation (%) | | | Light | Solvent resistance (ΔHaze (%)) | | |
| | MD | TD | $R_{MO}$ (%) | MD | TD | $R_{EL}$ (%) | resistance ΔYI | Avg. ($\Delta Hz_{AVG}$) | MIBK ($\Delta Hz_M$) | IPA ($\Delta Hz_I$) |
| Ex. 1 | 6.62 | 6.49 | 98.0 | 23.8 | 23.5 | 98.7 | 3.61 | 0.10 | 0.17 | 0.02 |
| Ex. 2 | 6.41 | 6.35 | 99.1 | 23.1 | 22.4 | 97 | 3.78 | 0.09 | 0.12 | 0.05 |
| Ex. 3 | 6.28 | 6.5 | 98.9 | 22.5 | 23.3 | 103.6 | 3.92 | 0.08 | 0.1 | 0.05 |
| C. Ex. 1 | 6.52 | 6.11 | 93.7 | 23.2 | 18.4 | 79.3 | 4.52 | 0.17 | 0.18 | 0.15 |
| C. Ex. 2 | 6.35 | 5.92 | 93.2 | 19.4 | 16.2 | 83.5 | 5.25 | 0.17 | 0.24 | 0.09 |
| C. Ex. 3 | 6.16 | 5.80 | 94.2 | 20.3 | 18.7 | 92.1 | 4.88 | 0.18 | 0.25 | 0.11 |

Referring to Tables 4 and 5, in the case of the films according to the embodiment in which the content of nitrogen (N) elements in the film was adjusted to 6 to 7.5% by weight based on the sum of the weights of carbon (C), hydrogen (H), oxygen (O), and nitrogen (N) elements in the film, the quality variation in the TD direction was significantly reduced in such major physical properties as transmittance, haze, yellow index, and modulus of the film, and it had isotropy, thereby enhancing the quality reliability of the film. Further, the amount of change in haze was below a certain level even after it was immersed in a solvent mainly used for post-process or exposed to light for a certain period of time, resulting in excellent solvent resistance and light resistance of the film.

| Explanation of Reference Numerals | |
|---|---|
| 100: polyamide-imide-based film | |
| 101: first side | 102: second side |
| 200: functional layer | 300: cover window |
| 400: display unit | 500: adhesive layer |
| A1, B1: heater mounting part | |
| A2, B2: gel sheet | |
| A3: belt | |
| HN, HC, HS: heater | |

The invention claimed is:

1. A polyamide-imide-based film, which has a content of nitrogen (N) elements in the film of 6 to 7.5% by weight based on the sum of the weights of carbon (C), hydrogen (H), oxygen (O), and nitrogen (N) elements in the film, wherein when the transmittance, haze, yellow index, and modulus are each measured at six points in total, in which two arbitrary points are selected in each of region N, region C, and region S partitioned in the TD direction of the film, the average value of transmittance is 80% or more, and the deviation rate of transmittance is 0.3% or less, the average value of haze is 1% or less, and the deviation rate of haze is 10% or less, the average value of yellow index is 5% or less, and the deviation rate of yellow index is 10% or less, and the average value of modulus is 5 GPa or more, and the deviation rate of modulus is 10% or less.

2. The polyamide-imide-based film of claim 1, wherein the content of nitrogen (N) elements in the film is 4 to 7% by weight based on the total weight of the film.

3. The polyamide-imide-based film of claim 1, wherein the content of nitrogen (N) elements in the film is 8 to 11 parts by weight relative to 100 parts by weight of carbon (C) elements in the film.

4. The polyamide-imide-based film of claim 1, wherein the sum of the contents of nitrogen (N) and hydrogen (H) elements in the film is 6 to 9% by weight based on the total weight of the film.

5. The polyamide-imide-based film of claim 1, wherein when the film is immersed in MIBK for 5 seconds and dried at 80° C. for 3 minutes, the amount of change in haze ($\Delta HZ_M$) is 0.2% or less when its haze is measured, and when the film is immersed in IPA for 5 seconds and dried at 80° C. for 3 minutes, the amount of change in haze ($\Delta HZ_I$) is 0.1% or less when its haze is measured.

6. The polyamide-imide-based film of claim 1, which has an $EC_A$ value of 15.9 or more as defined by the following Equation 1:

$$EC_A = \frac{22C_W}{(2O_W + 12H_W + 2N_W)} \qquad \text{[Equation 1]}$$

in Equation 1, $C_w$ is the content (% by weight) of carbon (C) elements contained in the film based on the total weight of the film, $O_w$ is the content (% by weight) of oxygen (O) elements contained in the film based on the total weight of the film, $H_w$ is the content (% by weight) of hydrogen (H) elements contained in the film based on the total weight of the film, and $N_w$ is the content (% by weight) of nitrogen (N) elements contained in the film based on the total weight of the film.

7. The polyamide-imide-based film of claim 1, which has an $EC_B$ value of 15.3 or more as defined by the following Equation 2, an $EC_C$ value of 14 or more as defined by the following Equation 3, and an $EC_D$ value of 10.5 or more as defined by the following Equation 4:

$$EC_B = \frac{33C_W}{(4O_W + 12H_W + 2N_W)} \quad \text{[Equation 2]}$$

$$EC_C = \frac{30C_W}{(4O_W + 12H_W + 2N_W)} \quad \text{[Equation 3]}$$

$$EC_D = \frac{(C_W + O_W)}{N_W} \quad \text{[Equation 4]}$$

in Equations 2 to 4, $C_w$ is the content (% by weight) of carbon (C) elements contained in the film based on the total weight of the film, $O_w$ is the content (% by weight) of oxygen (O) elements contained in the film based on the total weight of the film, $H_w$ is the content (% by weight) of hydrogen (H) elements contained in the film based on the total weight of the film, and $N_w$ is the content (% by weight) of nitrogen (N) elements contained in the film based on the total weight of the film.

8. The polyamide-imide-based film of claim 1, which has an $R_{MO}$ value of 95% to 105% as defined by the following Equation 5, and an $R_{EL}$ of 90% to 110% as defined by the following Equation 6:

$$R_{MO}(\%) = \frac{MO_T}{MO_M} * 100 \quad \text{[Equation 5]}$$

$$R_{EL}(\%) = \frac{EL_T}{EL_M} * 100 \quad \text{[Equation 6]}$$

in Equations 5 and 6, $MO_T$ is the modulus measured with the TD direction of the film as the longitudinal direction, $MO_M$ is the modulus measured with the MD direction of the film as the longitudinal direction, $EL_T$ is the elongation measured with the TD direction of the film as the longitudinal direction, and $EL_M$ is the elongation measured with the MD direction of the film as the longitudinal direction.

9. The polyamide-imide-based film of claim 1, wherein when the film is irradiated with a UV-A lamp (wavelength 340 nm) at 0.63 W/m$^2$ at 60° C. for 72 hours, the amount of change in yellow index (ΔYI) is 5 or less when the yellowness is measured.

10. The polyamide-imide-based film of claim 1, which has a transmittance of 80% or more, a haze of 1% or less, a yellow index of 5 or less, a modulus in the MD direction of 5 GPa or more, a modulus in the TD direction of 5 GPa or more, an elongation in the MD direction of 20% to 30%, and an elongation in the TD direction of 20% to 30%.

11. A cover window for a display device, which comprises a polyamide-imide-based film and a functional layer, wherein the content of nitrogen (N) elements in the polyamide-imide-based film is 6 to 7.5% by weight based on the sum of the weights of carbon (C), hydrogen (H), oxygen (O), and nitrogen (N) elements in the film.

12. A display device, which comprises a display unit; and a cover window disposed on the display unit, wherein the cover window comprises a polyamide-imide-based film and a functional layer, and the content of nitrogen (N) elements in the polyamide-imide-based film is 6 to 7.5% by weight based on the sum of the weights of carbon (C), hydrogen (H), oxygen (O), and nitrogen (N) elements in the film.

13. A process for preparing a polyamide-imide-based film of claim 1, which comprises:

polymerizing a diamine compound, a dianhydride compound, and a dicarbonyl compound in an organic solvent to prepare a polyamide-imide-based polymer solution;

casting the solution and then drying it to prepare a gel sheet; and thermally treating the gel sheet, wherein the step of thermally treating the gel sheet comprises thermally treating it through a first heater, a second heater, and a third heater spaced apart in the TD direction of the gel sheet, and when the temperature of the first heater corresponding to the center of the gel sheet is $T_{HC}$, and when the temperatures of the second heater and the third heater corresponding to both ends of the gel sheet are $T_{HN}$ and $T_{HS}$, respectively, $T_{HN}$ and $T_{HS}$ are higher than $T_{HC}$.

14. The process for preparing a polyimide-based composite film according to claim 13, wherein $T_{HC}$ is 300° C. to 360° C., and $T_{HN}$ and $T_{HS}$ are higher than $T_{HC}$ by 2% to 18%.

* * * * *